US012725503B2

(12) United States Patent
Dave et al.

(10) Patent No.: US 12,725,503 B2
(45) Date of Patent: Sep. 1, 2026

(54) END-TO-END SYSTEM FOR WIRELESS AMBIENT SENSING USING MILLIMETER WAVE RADAR

(71) Applicant: Samsung Electronics Co., Ltd., Suwon-si (KR)

(72) Inventors: Aditya Dave, Plano, TX (US); Wei Sun, Allen, TX (US); Indranil Sinharoy, Richardson, TX (US); Hao Chen, Allen, TX (US); Han Wang, Allen, TX (US); Russell Douglas Ford, Campbell, CA (US); Satvir S. Bhatia, Sunnyvale, CA (US); Andrea M. Small, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 139 days.

(21) Appl. No.: 18/900,241

(22) Filed: Sep. 27, 2024

(65) Prior Publication Data

US 2025/0118185 A1 Apr. 10, 2025

Related U.S. Application Data

(60) Provisional application No. 63/542,699, filed on Oct. 5, 2023.

(51) Int. Cl.

*G01S 13/58* (2006.01)
*G01S 7/41* (2006.01)
(Continued)

(52) U.S. Cl.

CPC ............ *G08B 21/043* (2013.01); *G01S 7/415* (2013.01); *G01S 13/886* (2013.01)

(58) Field of Classification Search

None
See application file for complete search history.

(56) References Cited

U.S. PATENT DOCUMENTS 11,796,637 B1 * 10/2023 Shah .......................... G06T 7/60
11,808,840 B2 * 11/2023 Rajab ..................... G01S 13/753
(Continued)

FOREIGN PATENT DOCUMENTS

CN 115005809 A 9/2022
CN 114005246 B 1/2024
(Continued)

OTHER PUBLICATIONS

International Search Report and Written Opinion issued Jan. 6, 2025 regarding International Application No. PCT/KR2024/015219, 9 pages.

*Primary Examiner* — John F Mortell

(57) ABSTRACT

A method comprises receiving, by a radar sensor, reflections from at least two points on a body of a user. The method comprises determining, by a processor operatively coupled to the radar sensor, a change of an elevation angle and a rate of change of the elevation angle of the user with respect to the radar sensor, based on the reflections from the at least two points on the body of the user. The method comprises determining changes of a radar cross-section (RCS) associated with the body of the user along an elevation dimension. The method comprises determining whether a fall event occurred based on at least one of: the rate of change and the change of the elevation angle, or the changes of the RCS.

20 Claims, 21 Drawing Sheets

(51) Int. Cl.
*G01S 13/88* (2006.01)
*G08B 21/04* (2006.01)

(56) References Cited

U.S. PATENT DOCUMENTS

| | | | | |
|---|---|---|---|---|
| 2019/0117130 | A1* | 4/2019 | Al-Alusi | G01S 13/50 |
| 2020/0219374 | A1 | 7/2020 | Hassey et al. | |
| 2020/0278445 | A1 | 9/2020 | Stevenson et al. | |
| 2022/0171024 | A1* | 6/2022 | Hu | G01S 13/42 |
| 2023/0018686 | A1* | 1/2023 | Shin | G01S 7/35 |
| 2023/0081472 | A1* | 3/2023 | Wang | H04W 4/029 340/539.12 |
| 2023/0112537 | A1 | 4/2023 | Sakamoto et al. | |
| 2023/0194690 | A1 | 6/2023 | Katz et al. | |
| 2024/0077603 | A1* | 3/2024 | Sundholm | G08B 21/0476 |
| 2024/0112559 | A1 | 4/2024 | Shin et al. | |

FOREIGN PATENT DOCUMENTS

| | | | |
|---|---|---|---|
| JP | 6868846 | B2 | 5/2021 |
| JP | 7691142 | B2 | 6/2025 |

* cited by examiner 210
205
TRANSCEIVER(S)
225
RX PROCESSING CIRCUITRY
230
SPEAKER(S)
220
MICROPHONE
215
TX PROCESSING CIRCUITRY
240
250
I/O IF
PROCESSOR(S)
INPUT
SENSOR(S)
DISPLAY
245
275
255
260
MEMORY
OPERATING SYSTEM (OS)
261
APPLICATIONS
262
SMARTTHINGS APP
263

END-TO-END SYSTEM FOR WIRELESS AMBIENT SENSING USING MILLIMETER WAVE RADAR

CROSS-REFERENCE TO RELATED APPLICATION(S) AND CLAIM OF PRIORITY

This application claims priority under 35 U.S.C. § 119 (e) to U.S. Provisional Patent Application No. 63/542,699 filed on Oct. 5, 2023. The above-identified provisional patent application is hereby incorporated by reference in its entirety.

TECHNICAL FIELD

This disclosure relates generally to radar systems. More specifically, this disclosure relates to an end-to-end system for wireless ambient sensing using millimeter wave radar.

BACKGROUND

Wireless sensing of human activities can provide ambient intelligence, which is without having any sensors on the body or object of interest. A myriad of sensors incorporated within everyday appliances are connected, via the cloud, with distributed processing capability. This myriad of sensors includes wireless sensors, such as mmWave frequency modulated continuous wave (FMCW) radar or ultra-wideband (UWB) radar attached to televisions, refrigerators, robot vacuum cleaners, etc. This myriad of sensors can be used make every spaces more intelligent. For example, wireless sensors can monitor or detect human activity, provide situational awareness, and respond to emergency needs. For example, in a scenario of elderly care, such sensors and algorithms may be employed to detect a fall, and to perform intelligent actions such as notifying appropriate authorities responsible for medical care and family members. Such solutions are not restricted only to the above-described sensors. Ubiquitous Wi-Fi signals can also be employed to detect human presence, fall and several other activities. The signals from multiple sensors embedded in a variety of appliances and devices in our living spaces can be fused and processed in a smart cloud to provide a range of integrated solutions for smart, non-invasive sensing without the need for the user to carry mobile devices.

SUMMARY

This disclosure provides an end-to-end system for wireless ambient sensing using millimeter wave radar.

In one embodiment, a method for differentiation of fall activity from non-fall activity using mmWave radar signals in an end-to-end system for wireless ambient sensing, in order to improve detection of a fall event is provided. The method comprises receiving, by a radar sensor, reflections from at least two points on a body of a user. The method comprises determining, by a processor operatively coupled to the radar sensor, a change of an elevation angle and a rate of change of the elevation angle of the user with respect to the radar sensor, based on the reflections from the at least two points on the body of the user. The method comprises determining changes of a radar cross-section (RCS) associated with the body of the user along an elevation dimension. The method comprises determining whether a fall event occurred based on at least one of: the rate of change and the change of the elevation angle, or the changes of the RCS.

In another embodiment, an electronic device for differentiation of fall activity from non-fall activity using mmWave radar signals in an end-to-end system for wireless ambient sensing, in order to improve detection of a fall event is provided. The electronic device includes a radar sensor and a processor operably coupled to the radar sensor. The radar sensor is configured to receive reflections from at least two points on a body of a user. The processor is configured to determine a change of an elevation angle and a rate of change of the elevation angle of the user with respect to the radar sensor, based on the reflections from the at least two points on the body of the user. The processor is configured to determine changes of a radar cross-section (RCS) associated with the body of the user along an elevation dimension. The processor is configured to determine whether a fall event occurred based on at least one of: the rate of change and the change of the elevation angle; or the changes of the RCS.

In yet another embodiment, a non-transitory computer readable medium embodying a computer program for differentiation of fall activity from non-fall activity using mmWave radar signals in an end-to-end system for wireless ambient sensing, in order to improve detection of a fall event is provided. The computer program comprises program code that, when executed by a processor of an electronic device, causes the electronic device to receive, by a radar sensor, reflections from at least two points on a body of a user. The program code, when executed, causes the electronic device to determine a change of an elevation angle and a rate of change of the elevation angle of the user with respect to the radar sensor, based on the reflections from the at least two points on the body of the user. The program code, when executed, causes the electronic device to determine changes of a radar cross-section (RCS) associated with the body of the user along an elevation dimension. The program code, when executed, causes the electronic device to determine whether a fall event occurred based on at least one of: the rate of change and the change of the elevation angle; or the changes of the RCS.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Definitions for other certain words and phrases may be provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged wireless communication system or device.

Users desire high reliability in the detection and classification of the various human activities. A missed fall detection of an elderly human may be fatal. At the same time, frequent false alarms, such as frequent misclassification of benign activities as fall events, can annoy the user and prompt the user to turn off the fall detection system. Detecting different activities accurately with minimum false alarms is a difficult challenge or hard problem to solve. This problem is further aggravated in systems that completely rely on wireless signals for activity detection so that the user's privacy may be protected. While a number of robust solutions for activity detection using camera and vision processing (namely, image processing) are available, the data sensed by image sensors may not protect the user's privacy in the way that wireless based sensing can protect.

The embodiments in this disclosure provide solutions for detection of human presence in a room, classification between a fall-activity and non-fall activity, and also for tracking the location of the human in the room using mmWave FMCW radar sensing. The mmWave radar module and associated algorithm can either be used in a standalone configuration or can be a configuration embedded in one or more devices such as TVs, ovens, refrigerators, smart hubs, smart speakers, etc. The embodiments in this disclosure also provide techniques of how to fuse information from multiple smart devices connected via a smart cloud to provide an end-to-end integrated solution for detection of unusual activities (such as fall activity and fall events) and emergency response.

Some of the technical advantages provided by embodiments of this disclosure include: detecting a fall event for a user based on utilizing one or more computed changes in at least an elevation angle of the user with respect to a sensor and a rate of change of the elevation angle, wherein all metrics are computed using reflections from at least two or more points on the body. Additional technical advantages provided by embodiments of this disclosure include: detecting a fall event based on one or more radar cross-section (RCS) changes along a vertical direction, wherein the RCS is computed by sampling the body into multiple points that differentiate the body into at least two regions to compare change in the radar cross-section.

Figure 1:
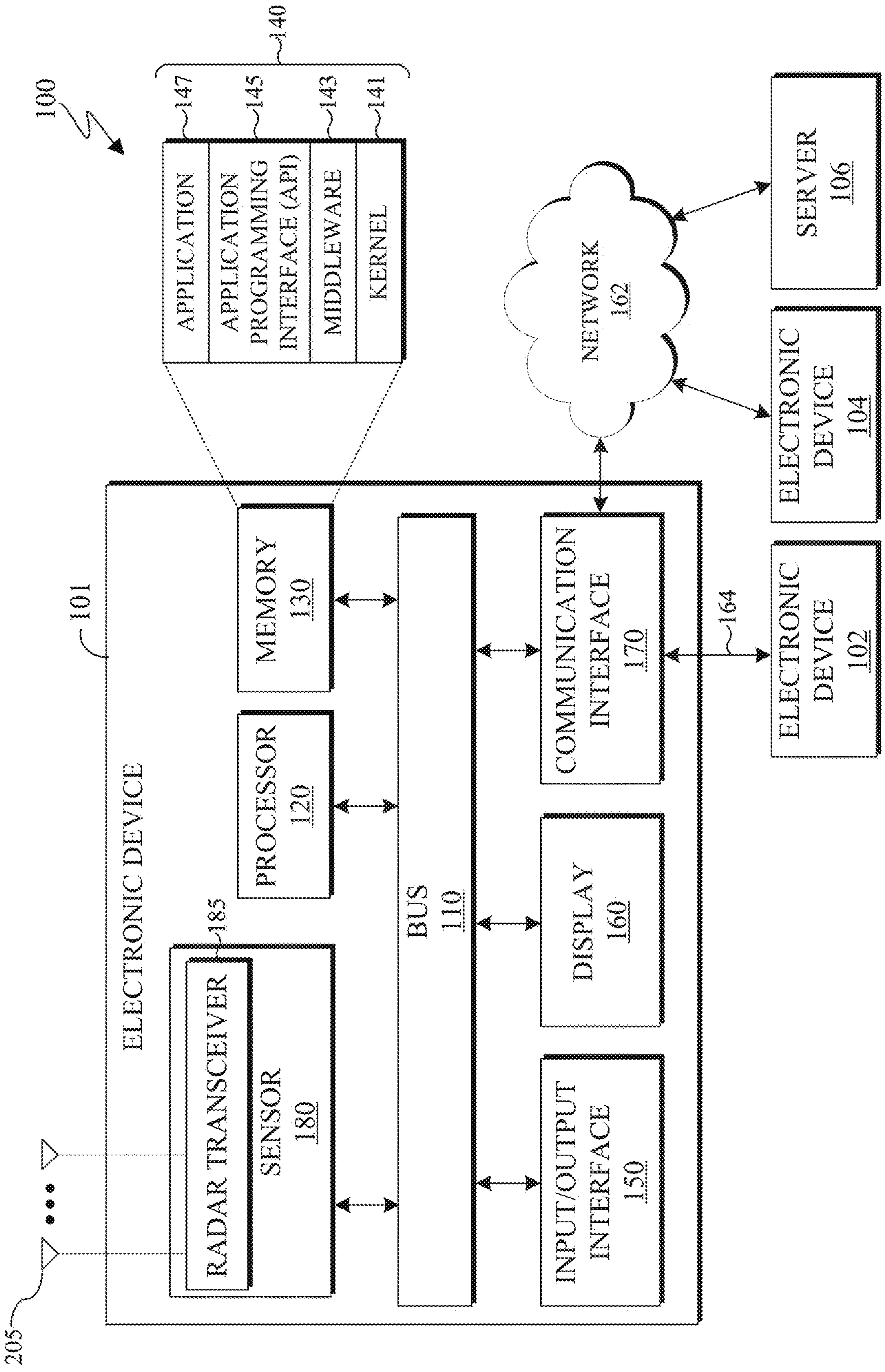
FIG. 1 illustrates an example network configuration including an electronic device according to this disclosure.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). As described in more detail below, the processor 120 may perform one or more operations to support differentiation of fall activity from non-fall activity using mmWave radar signals in an end-to-end system for wireless ambient sensing, in order to improve detection of a fall event.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support one or more functions for differentiation of fall activity from non-fall activity using mmWave radar signals in an end-to-end system for wireless ambient sensing, in order to improve detection of a fall event as discussed below. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first external electronic device 102, a second external electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The electronic device 101 as used herein can include a transceiver that can both transmit and receive radar signals. For example, the sensor(s) 180 includes a radar transceiver 185, as described more particularly below. The radar transceiver 185 can include an antenna array that includes numerous antennas. In this embodiment, one or more transceivers in the sensor(s) 180 is a radar transceiver 185 that is configured to transmit and receive signals for detecting and ranging purposes. For example, the radar transceiver 185 may be any type of transceiver including, for example, the signals transmitted by the radar transceiver 185 can include, but are not limited to, millimeter wave (mmWave) signals. The radar transceiver 185 can receive the signals, which were originally transmitted from the radar transceiver 185, after the signals have bounced or reflected off of target objects in the surrounding environment of the electronic device 101. In some embodiments, the radar transceiver 185 can be associated with the input 250 to provide additional inputs to the processor 120.

Figure 4:
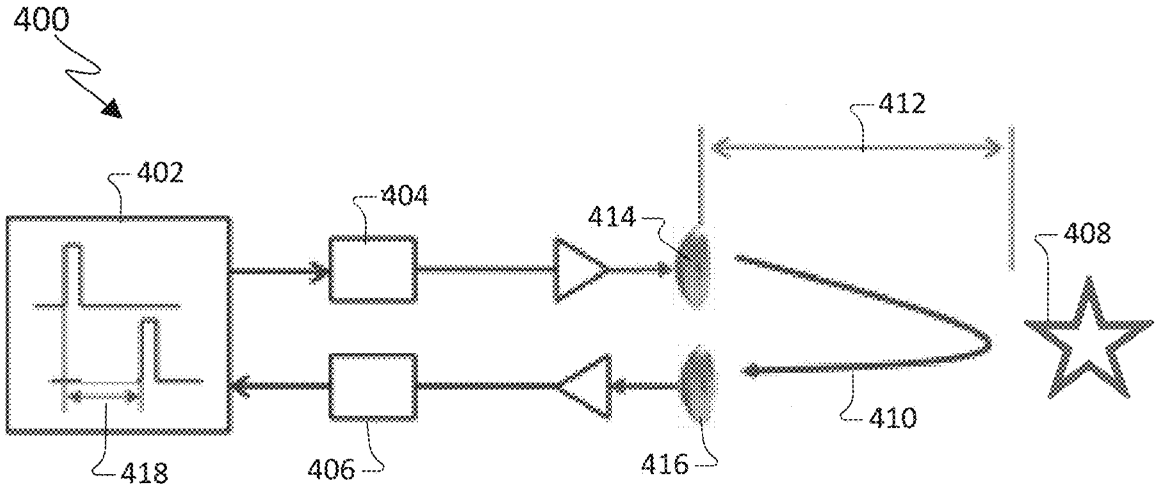
FIG. 4 illustrates an example architecture of a monostatic radar in an electronic device 400 in accordance with an embodiment of this disclosure.

In certain embodiments, the radar transceiver 185 is a monostatic radar. A monostatic radar includes a transmitter of a radar signal and a receiver, which receives a delayed echo of the radar signal, which are positioned at the same or similar location. For example, the transmitter and the receiver can use the same antenna or nearly co-located while using separate, but adjacent antennas. Monostatic radars are assumed coherent such that the transmitter and receiver are synchronized via a common time reference. FIG. 4, below, illustrates an example monostatic radar.

In certain embodiments, the radar transceiver 185 can include a transmitter and a receiver. In the radar transceiver 185, the transmitter of can transmit millimeter wave (mmWave) signals. In the radar transceiver 185, the receiver can receive the mmWave signals originally transmitted from the transmitter after the mmWave signals have bounced or reflected off of target objects in the surrounding environment of the electronic device 101. The processor 120 can analyze the time difference between when the mmWave signals are transmitted and received to measure the distance of the target objects from the electronic device 101. Based on the time differences, the processor 120 can generate an image of the object by mapping the various distances.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform one or more operations to support differentiation of fall activity from non-fall activity using mmWave radar signals in an end-to-end system for wireless ambient sensing, in order to improve detection of a fall event.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
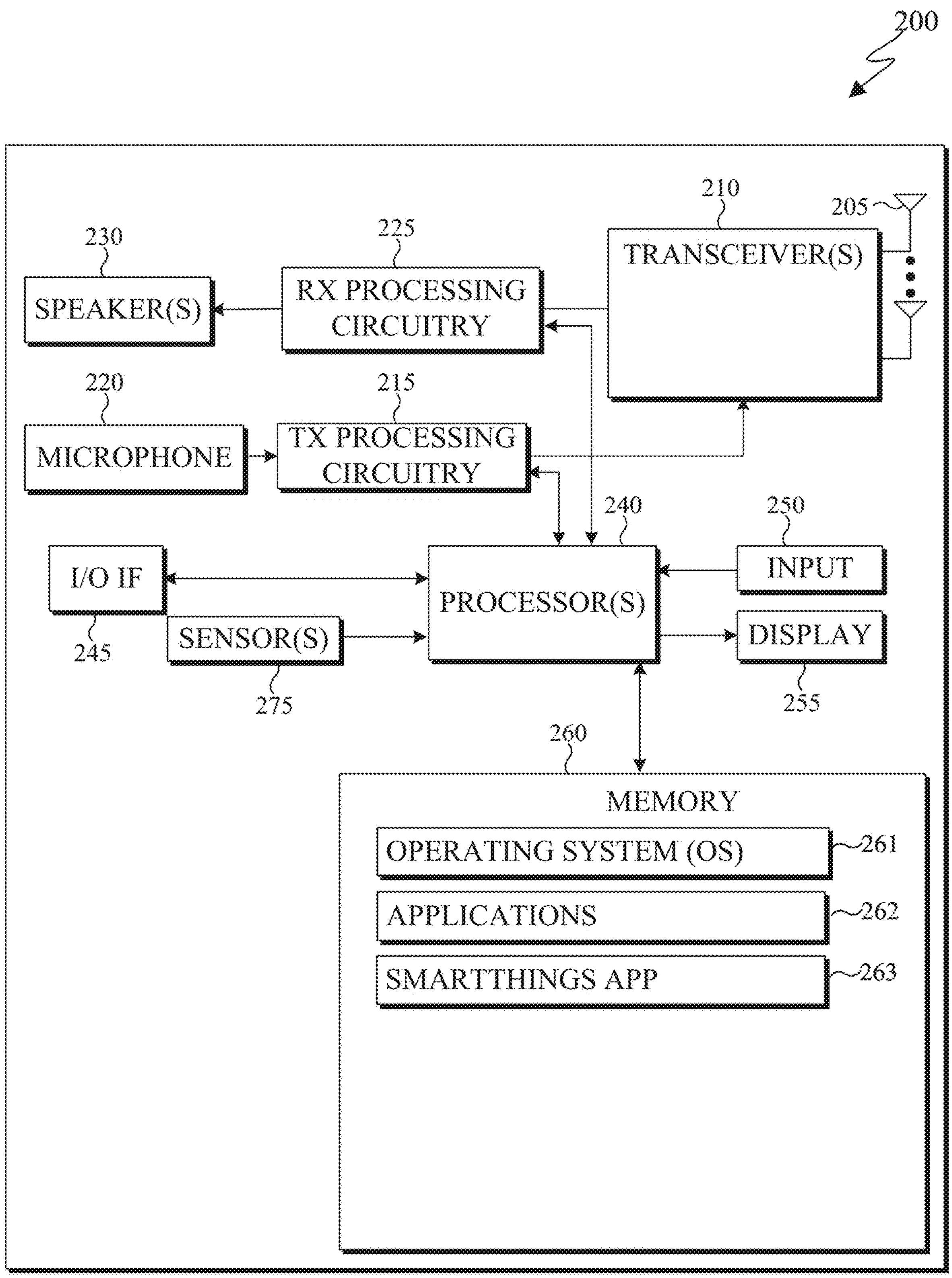
FIG. 2 illustrates an example electronic device in accordance with an embodiment of this disclosure.

FIG. 2 illustrates an example electronic device in accordance with an embodiment of this disclosure. In particular, FIG. 2 illustrates an example electronic device 200, and the electronic device 200 could represent one or more of the external electronic devices 102-104 or the server 106 in FIG. 1. The electronic device 200 can be a mobile communication device, such as, for example, a mobile station, a subscriber station, a wireless terminal, a desktop computer, a portable electronic device (similar to a mobile device 108, a PDA, a laptop computer, or a tablet computer), a wearable device or an electronic device-mountable wearable device (such as an HMD 730 shown in FIG. 7), a robot, and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WiFi transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, and a sensor 275. The memory 260 includes an operating system (OS) 261, and one or more applications 262.

The transceiver(s) 210 can include an antenna array 205 including numerous antennas. The transceiver(s) 210 can include or can be the same as or similar to the radar transceiver 185 of FIG. 1. The antennas of the antenna array can include a radiating element composed of a conductive material or a conductive pattern formed in or on a substrate. The transceiver(s) 210 transmit and receive a signal or power to or from the electronic device 200. The transceiver(s) 210 receives an incoming signal transmitted from an access point (such as a base station, WiFi router, or BLUETOOTH device) or other device of the network configuration 100 (such as a WiFi, BLUETOOTH, cellular, 5G, 6G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of downlink (DL) channel signals and the transmission of uplink (UL) channel signals by the transceiver(s) 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, the processor 240 can include a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. Example, applications 262 can include a SmartThings application 263, a multimedia player (such as a music player or a video player), a phone calling application, a video conferencing application, a text messaging application, a virtual personal assistant, and the like.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user in interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active-matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 275 that can meter a physical quantity or detect an activation state of the electronic device 200 and convert metered or detected information into an electrical signal. For example, the sensor 275 can include one or more buttons for touch input, a camera, a gesture sensor, optical sensors, cameras, one or more inertial measurement units (IMUs), such as a gyroscope or gyro sensor, and an accelerometer. The sensor 275 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 275 can further include control circuits for controlling any of the sensors included therein. Any of these sensor(s) 275 may be located within the electronic device 200 or within a secondary device operably connected to the electronic device 200.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

Figure 3:
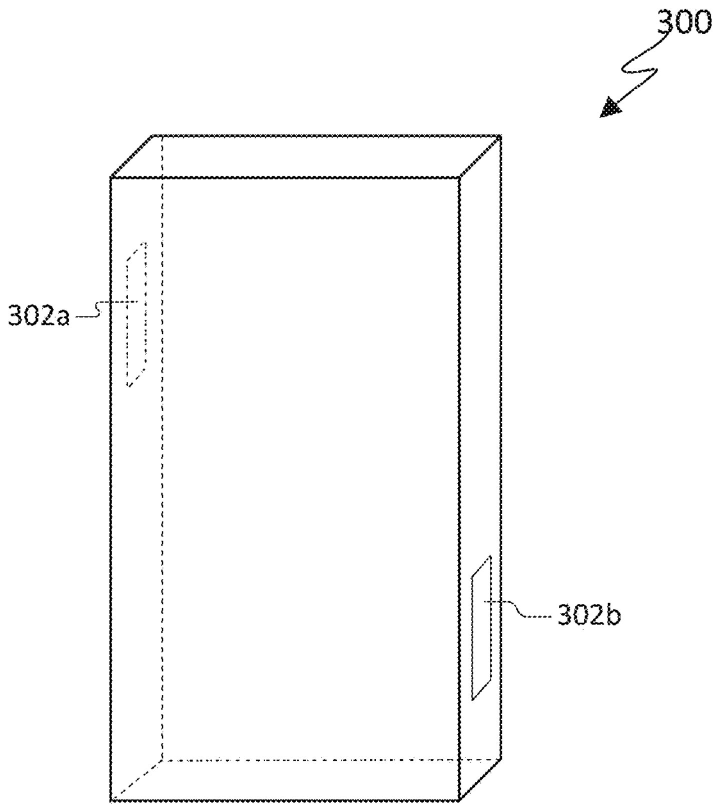
FIG. 3 illustrates a three-dimensional view of an example electronic device that includes multiple millimeter wave (mmWave) antenna modules in accordance with an embodiment of this disclosure.

FIG. 3 illustrates a three-dimensional view of an example electronic device 300 that includes multiple millimeter wave (mmWave) antenna modules 302 in accordance with an embodiment of this disclosure. The electronic device 300 could represent one or more of the electronic devices 101-104 in FIG. 1 or the electronic device 200 in FIG. 2. The embodiments of the electronic device 300 illustrated in FIG. 3 are for illustration only, and other embodiments can be used without departing from the scope of the present disclosure.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

The first antenna module 302*a* and the second antenna module 302*b* are positioned at the left and the right edges of the electronic device 300. For simplicity, the first and second antenna modules 302*a*-302*b* are generally referred to as an antenna module 302. In certain embodiments, the antenna module 302 includes an antenna panel, circuitry that connects the antenna panel to a processor (such as the processor 240 of FIG. 2), and the processor.

The electronic device 300 can be equipped with multiple antenna elements. For example, the first and second antenna modules 302*a*-302*b* are disposed in the electronic device 300 where each antenna module 302 includes one or more antenna elements. The electronic device 300 uses the antenna module 302 to perform beamforming when the electronic device 300 attempts to establish a connection with a base station (for example, base station 116).

FIG. 4 illustrates an example architecture of a monostatic radar in an electronic device 400 in accordance with an embodiment of this disclosure. The embodiments of the architecture of the monostatic radar illustrated in FIG. 4 are for illustration only and other embodiments can be used without departing from the scope of the present disclosure.

The electronic device 400 that includes a processor 402, a transmitter 404, and a receiver 406. The electronic device 400 can be similar to any of the client devices 106-114 of FIG. 1, the electronic device 200 of FIG. 2, or the electronic device 300 of FIG. 3. The processor 402 is similar to the processor 240 of FIG. 2. Additionally, the transmitter 404 and the receiver 406 can be included within the radar transceiver 270 of FIG. 2. The radar can be used to detect the range, velocity and/or angle of a target object 408. Operating at mmWave frequency with GHz of bandwidth (e.g., 2, 3, 5 or 7 GHz bandwidth), the radar can be useful for applications such as proximity sensing, gesture recognition, liveness detection, mmWave blockage detection, and so on.

The transmitter 404 transmits a signal 410 (for example, a monostatic radar signal) to the target object 408. The target object 408 is located a distance 412 from the electronic device 400. In certain embodiments, the target object 408 corresponds to the objects that form the physical environment around the electronic device 400. For example, the transmitter 404 transmits a signal 410 via a transmit antenna 414. The signal 410 reflects off of the target object 408 and is received by the receiver 406 as a delayed echo, via a receive antenna 416. The signal 410 represents one or many signals that can be transmitted from the transmitter 404 and reflected off of the target object 408. The processor 402 can identify the information associated with the target object 408 based on the receiver 406 receiving the multiple reflections of the signals.

The processor 402 analyzes a time difference 418 from when the signal 410 is transmitted by the transmitter 404 and received by the receiver 406. The time difference 418 is also referred to as a delay, which indicates a delay between the transmitter 404 transmitting the signal 410 and the receiver 406 receiving the signal after the signal is reflected or bounced off of the target object 408. Based on the time difference 418, the processor 402 derives the distance 412 between the electronic device 400, and the target object 408. The distance 412 can change when the target object 408 moves while electronic device 400 is stationary. The distance 412 can change when the electronic device 400 moves while the target object 408 is stationary. Also, the distance 412 can change when the electronic device 400 and the target object 408 are both moving.

Figure 5:
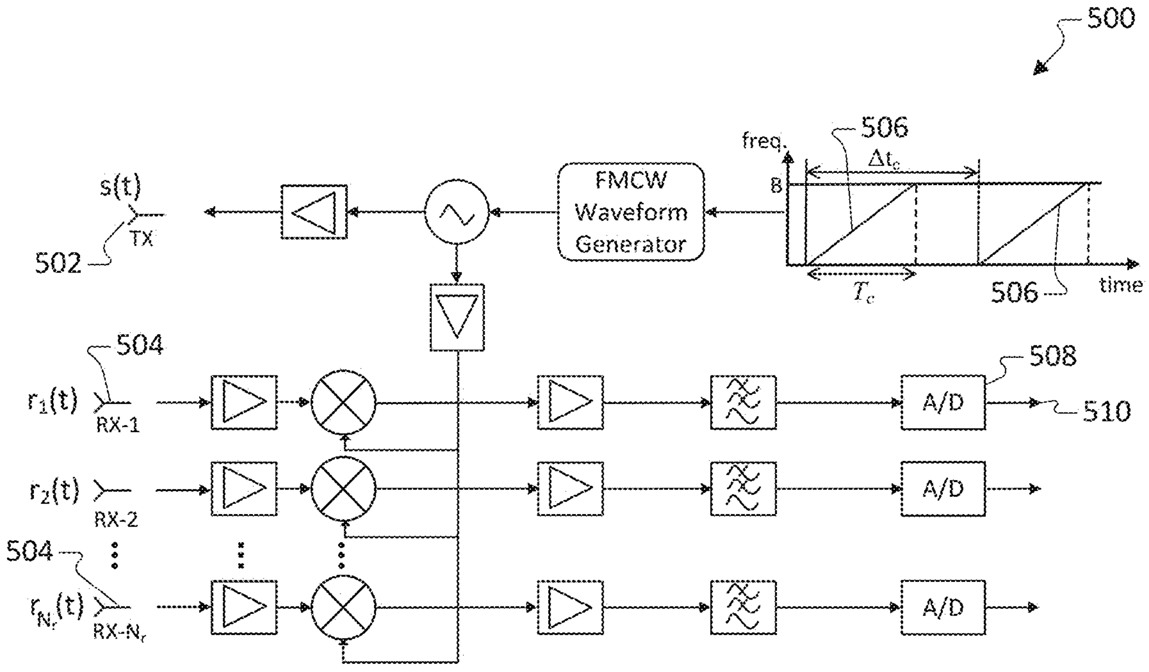
FIG. 5 illustrates a mmWave monostatic frequency-modulated continuous wave (FMCW) transceiver system in accordance with an embodiment of this disclosure.

FIG. 5 illustrates a mmWave monostatic frequency-modulated continuous wave (FMCW) transceiver system 500 in accordance with an embodiment of this disclosure. The FMCW transceiver system 500 could be included in one or more of the electronic devices 101-104 of FIG. 1, the electronic device 200 of FIG. 2, or the electronic device 300 of FIG. 3. The transmitter and the receiver within the FMCW transceiver system 500 can be included within the radar transceiver 185 of FIG. 1. The FMCW transceiver system 500 operates as a radar that can be used to detect the range, velocity and/or angle of a target object (such as the target object 408 of FIG. 4). The embodiments of the FMCW transceiver system 500 illustrated in FIG. 5 are for illustration only, and other embodiments can be used without departing from the scope of the present disclosure.

The FMCW transceiver system 500 includes a mmWave monostatic FMCW radar with sawtooth linear frequency modulation. The operational bandwidth (B) of the radar can be a difference between minimum and maximum sweep frequencies of the radar $f_{min}$ and $f_{max}$, respectively. The radar is equipped with a single transmit antenna 502 and $N_r$ receive antennas 504. The receive antennas 504 can form a uniform linear array (ULA) in some embodiments.

The transmitter transmits a frequency modulated sinusoid chirp 506 of duration $T_c$ over the bandwidth B. In the time domain, the transmitted chirp s(t) 506 is a function of the amplitude $A_T$ of the transmit signal, the minimum sweep frequency $f_{min}$, and a ratio $$\frac{B}{T_c}$$

that controls the frequency ramp of s(t).

When the transmitted chirp s(t) 506 impinges on an object (such as a finger, hand, or other body part of a human), the reflected signal from the object is received at the $N_r$ receive antennas 504. The object is at located at a distance $R_0$ from the radar (for example, from the transmit antenna 502). In this disclosure, the distance $R_0$ is also referred to as the "object range," "object distance," or "target distance." In some embodiments, one dominant reflected path can be assumed as a received signal r(t) at the reference antenna.

The beat signal $r_{b(t)}$ for the reference antenna is obtained by low pass filtering the output of the mixer. For the reference antenna, the beat signal is expressed according to Equation 1, where the last approximation follows from the fact that the propagation delay is orders of magnitude less than the chirp duration, namely, $\tau<<T_c$. The beat signal $r_{b(t)}$ can be expressed as a function of the amplitude $A_R$ of the reflected signal which is a function of $A_T$, distance between the radar and the reflecting object, and the physical properties of the object. Also, t represents the round trip time delay to the reference antenna at the speed of light c.

$$r_{b(t)} = \frac{A_T A_R}{2}\cos\left(2\pi\left(f_{min}\tau + S\tau t - \frac{1}{2}S\tau^2\right)\right) \approx \frac{A_T A_R}{2}\cos(2\pi S\tau t - 2\pi f_{min}\tau) \quad (1)$$

The beat frequency fb and the beat phase op are two of the parameters of the beat signal $r_{b(t)}$. The beat frequency is used to estimate the object range $R_0$. The beat frequency is obtained by taking the Fourier transform of the beat signal that directly gives the range $R_0$. To do so, the beat signal $r_{b(t)}$ is passed through an analog to digital converter (ADC) 508 with a sampling frequency $F_s$ and a sampling period $T_s$ such that each chirp 506 is sampled $N_s$ times, and the chirp duration is denoted as $T_c$.

Further, for a moving target object, the velocity can be estimated using beat phases corresponding to at least two consecutive chirps. For example, if two chirps 506 are transmitted with a time separation of $\Delta t_c$ (where $\Delta t_c > T_c$), then the difference $\Delta\phi_b$, in beat phases can be expressed as function of the velocity $v_0$ of the object.

The ADC output 510 corresponding to the n-th chirp is $x_n \in \mathcal{R}^{N_s\times 1}$ and defined according to Equation 2. The $N_s$-point fast Fourier transform (FFT) output of $x_n$ is denoted as $X_n$. Assuming a single object, the frequency bin that corresponds to the beat frequency can be obtained according to Equation 3. In consideration of the fact that the radar resolution $r_{min}$ is expressed as the speed of light c divided by double the chirp bandwidth B (shown above in Equation 13), the n-th bin of the FFT output corresponds to a target located within $$\left[\frac{kc}{2B} - \frac{kc}{4B}, \frac{kc}{2B} + \frac{kc}{4B}\right]$$

for $1 \le k \le N_s - 1$. As the range information of the object is embedded in $X_n$, it is also referred to as the range FFT.

$$x_n = \left[\{x[k, n]\}_{k=0}^{N_s-1}\right] \text{ where } x[k, n] = r_b(n\Delta t_c + kT_s) \quad (2)$$

$$k^\star = \text{argmax}\|X_n\|^2 \quad (3)$$

Figure 6:
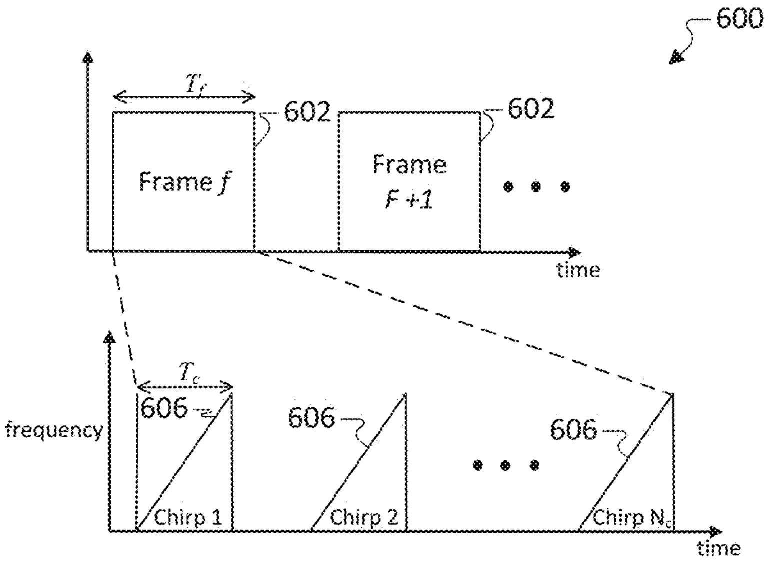
FIG. 6 illustrates a frame-based radar transmission timing structure in accordance with an embodiment of this disclosure.

FIG. 6 illustrates a frame-based radar transmission timing structure 600 in accordance with an embodiment of this disclosure. The embodiments of the frame-based radar transmission timing structure 600 illustrated in FIG. 6 are for illustration only, and other embodiments can be used without departing from the scope of the present disclosure.

The radar transmission timing structure 600 is used to facilitate velocity estimation. The radar transmissions are divided into frames 602, where each frame includes $N_c$ equally spaced chirps 606. The chirps 606 of FIG. 6 can be similar to the chirps 506 of FIG. 5. The range FFT of each chirp 606 provides the phase information on each range bin. For a given range bin, the Doppler spectrum, which includes the velocity information, is obtained by applying $N_c$-point FFT across the range FFTs of chirps corresponding to that range bin. The range-Doppler map (RDM) is constructed by repeating the above-described procedure for each range bin. The RDM is denoted as M, which is obtained by taking $N_c$-point FFT across all the columns of R. In Equation 4, this disclosure provides the following mathematical definition:

$$R \in \mathcal{C}^{N_c \times N_s} \text{ as } R = \left[X_0, X_1, \ldots, X_{N_c-1}\right]^T \tag{4}$$

The minimum velocity that can be estimated corresponds to the Doppler resolution, which is inversely proportional to the number of chirps $N_c$ and is expressed accorded to Equation 5.

$$v_{min} = \frac{\lambda_{max}}{2N_c T_c} \tag{5}$$

Further, the maximum velocity that can be estimated as shown in Equation 6.

$$v_{max} = \frac{N_c}{2} v_{min} = \frac{\lambda_{max}}{4T_c} \tag{6}$$

As an example, the FMCW transceiver system 500 of FIG. 5 can generate and utilize the frame-based radar transmission timing structure 600 of FIG. 6 for further processing, such as radar signal processing that includes clutter removal. The description of a clutter removal procedure will refer to both FIGS. 5 and 6.

In the case of a monostatic radar, the RDM obtained using the above-described technique has significant power contributions from direct leakage from the transmitting antenna 502 to the receiving antennas 504. Further, the contributions (e.g., power contributions) from larger and slowly moving body parts, such as the first and forearm can be higher compared to the power contributions from the fingers. Because the transmit and receive antennas 502 and 504 are static, the direct leakage appears in the zero-Doppler bin in the RDM. On the other hand, the larger body parts (such as the first and forearm) move relatively slowly compared to the fingers. Hence, signal contributions from the larger body parts mainly concentrate at lower velocities. Because the contributions from both these artifacts dominate the desired signal in the RDM, the clutter removal procedure according to embodiments of this disclosure remove them using appropriate signal processing techniques. The static contribution from the direct leakage is simply removed by nulling the zero-Doppler bin. To remove the contributions from slowly moving body parts, the sampled beat signal of all the chirps in a frame are passed through a first-order infinite impulse response (IIR) filter. For the reference frame f 602, the clutter removed samples corresponding to all the chirps can be obtained as expressed in Equation 7, where $\overline{y_f}$ [k, n] includes contributions from all previous samples of different chirps in the frame.

$$\hat{x}_f[k, n] = x_f[k, n] - \overline{y_f}[k, n-1] \tag{7}$$

$$\overline{y_f}[k, n] = \alpha x_f[k, n] + (1-\alpha)\overline{y_f}[k, n-1]$$

$$\text{for } 0 \le k \le N_s - 1 \text{ and } 0 \le n \le N_c - 1$$

This disclosure uses the following notation as shown in Table 1. The fast Fourier transform (FFT) output of a vector x is denoted as X. The N×N identity matrix is represented by $I_N$, and the N×1 zero vector is $0_{N\times1}$. The set of complex and real numbers are denoted $\mathcal{C}$ and $\mathcal{R}$, respectively.

TABLE 1

| Notation | | |
|---|---|---|
| Letter or Symbol | Typeface | What is represented |
| x | bold lowercase | column vectors |
| X | bold uppercase | matrices |
| x and X | non-bold letters | Scaler |
| T | superscript | transpose |
| * | superscript | conjugate transpose |

Figure 7:
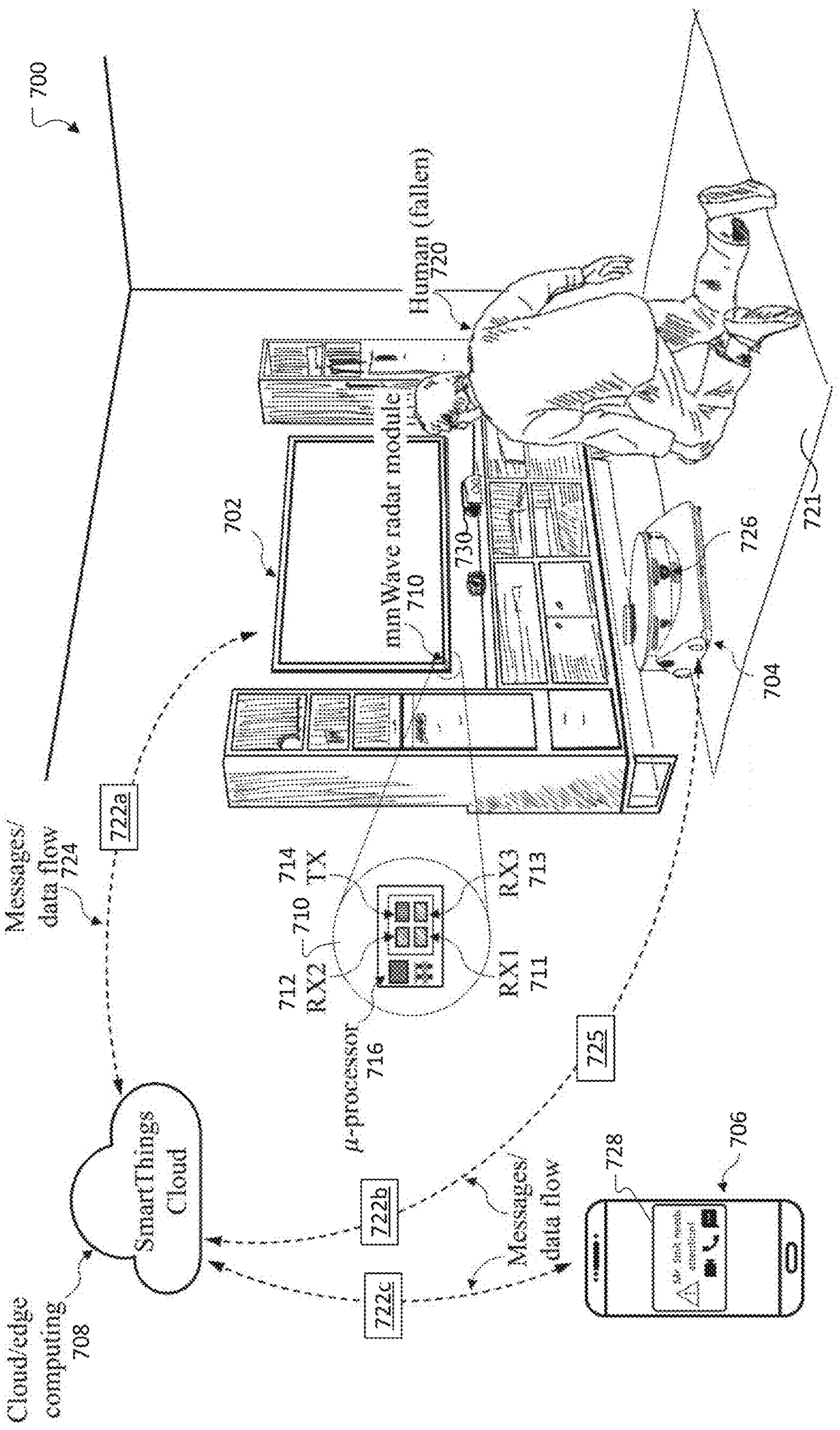
FIG. 7 illustrates an example the closed-loop system for mmWave Radar-based fall detection and emergency response in accordance with an embodiment of this disclosure.

FIG. 7 illustrates an example the closed-loop system 700 for mm Wave Radar-based fall detection and emergency response in accordance with an embodiment of this disclosure. The embodiment of the system 700 shown in FIG. 7 is for illustration only, and other embodiments could be used without departing from the scope of this disclosure.

The closed-loop system 700 implements mmWave Radar-based fall detection and emergency response. The closed-loop system 700 includes a smart television (TV) 702, smart robot vacuum cleaner 704, smartphone 706, and the like interconnected via a cloud 708. The smart TV 702 can be the electronic device 101 of FIG. 1, the electronic device 300 of FIG. 3, or electronic device 400 of FIG. 4. The cloud 708 can be a smart cloud, cloud/edge computing system referred to as a smart hub, SmartThings Cloud, a cloud-based computer such as the server 106 of FIG. 1, or a server-based application. In the closed-loop system 700, a mmWave FMCW radar 710 (radar module) is embedded under the bezel of a smart TV 702. In some embodiments, the radar 710 can be mounted on the front of the smart TV 702 like an accessory device. The location of the radar 710 can be stationary during operation of the radar, as users of the smart TV 702 rarely relocate or reposition the smart TV 702 after initial setup of the television.

The radar 710 includes multiple receiver antennas 711, 712, and 713 (illustrated as RX1, RX2, and RX3), one or more transmit antennas 714, and a microprocessor 716. During operation of the radar 710, the stationary location of the radar can be a height above. The radar 710 continually transmits electromagnetic waves at a frequency that is modulated continuously. The channel impulse response (CIR) signal at the receiver antennas 711, 712, and 713 is obtained from the electromagnetic signals reflected from target objects, such as user 720 (for example, one or more humans) that are in front of the radar 710. The CIR signal is multidimensional with the number of chirps per frame (and at each receiving antennas), number of samples per chirp, and the time-domain frames as the different axes of the multidimensional array. The Doppler and micro-Doppler signatures obtained by computing a sequence of the FFTs of the CIR signal along various axes can revel various activities of interest. Once the presence of a person (such as the user 720) is detected, the location of the person with respect to the radar 710 is tracked by computing the range and direction of the target object (user 720) from the radar 710. If a fall event occurs in which the person (user 720) falls to the floor 721, the fall activity is detected using an energy-based algorithm and classified as fall (or non-fall) using an ML-based algorithm based the change in elevation angle with time and the change in the velocity of the target with time. Once a fall event is detected, the smart TV 702 transmits (via a communication connection 724) this information **722*a* corresponding to the fall event along with the location of the target object (user 720) to the smart cloud 708 that processes this information 722*a*. The smart cloud 708 relays this information 722*a* to the connected smartphone 706 and mobile robot 704**, respectively.

In some embodiments, once a fall event is detected, a standalone fall detector (such as the radar 710) transmits information **722*a* corresponding to the fall event to the smart cloud 708. The information 722*a* includes an emergency response alert message along with the location of the user. In an embodiment of this disclosure, the smart cloud 708 can delegate a variety of tasks to other smart devices connected in the smart home. For example, the smart cloud 708 can delegate a camera-enabled smart device such as robot vacuum cleaner to move to the vicinity of the fall and stream visual data to the cloud. In turn, the cloud 708 can relay the video and other crucial information to a smartphone 706** or tablet that may be viewed by another human or AI attendant in a remote location for further action.

Particularly, the smart cloud 708 directs (for example, via the relayed information **722*b* corresponding to the fall event) the mobile robot 704 to approach the location of the fall. The robot 704 arrives at the location of the fall and streams live video 725 (captured by a built-in camera 726) of the environment to smartphone 706** via the smart hub and cloud.

The relayed information **722*c* corresponding to the fall event can trigger the smartphone 706 to display a fall event notification 728. In some embodiments, the fall event notification 728 can include the streamed live video 725 or a recorded portion of the video, and can include an emergency response alert message. The smartphone 706 can be owned by or registered to be used by an attendant such as a family member, neighbor, or caregiver of the user 720. The notification 728 can inform the attendant that a fall event occurred, for example, stating that "Mr. Smit needs attention!" An attendant can use the smartphone 706 to initiate a voice and/or video call with the user 720 who has fallen. Alternatively, if the fallen user 720 does not respond with an appropriate time, the cloud 708** (or the attendant) may raise an emergency alert to emergency response services (such as the ambulance service).

Figure 8:
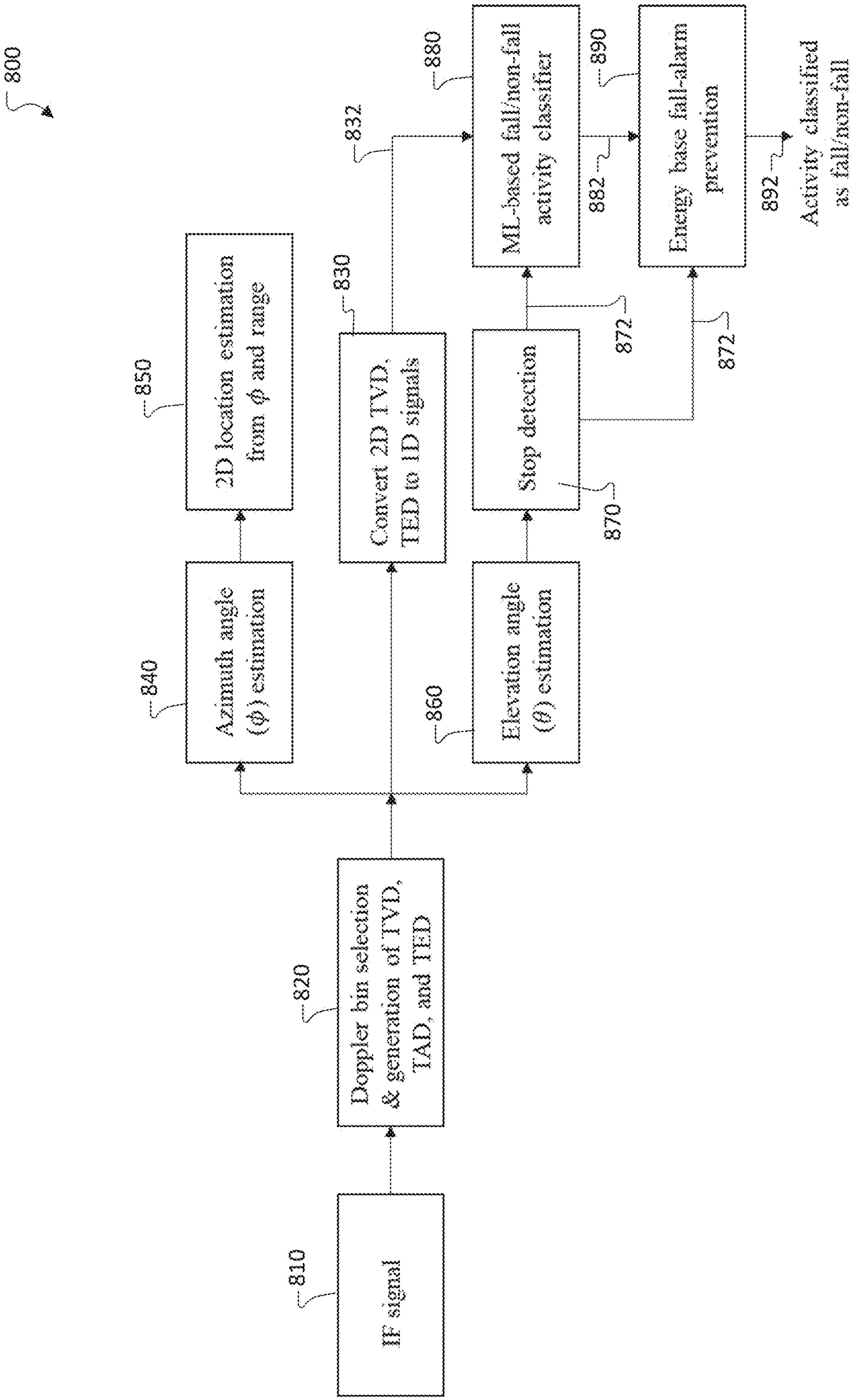
FIG. 8 illustrates an example pipeline of the mmWave FMCW Radar-based human activity and fall detection system in accordance with an embodiment of this disclosure.

FIG. 8 illustrates an example pipeline 800 of the mmWave FMCW Radar-based human activity and fall detection system in accordance with an embodiment of this disclosure. The embodiment of the pipeline 800 shown in FIG. 8 is for illustration only, and other embodiments could be used without departing from the scope of this disclosure. The pipeline 800 can be implemented in the electronic device 101 of FIG. 1, the SmartThings app 263 of FIG. 2, or the system 700 of FIG. 7.

Figure 11:
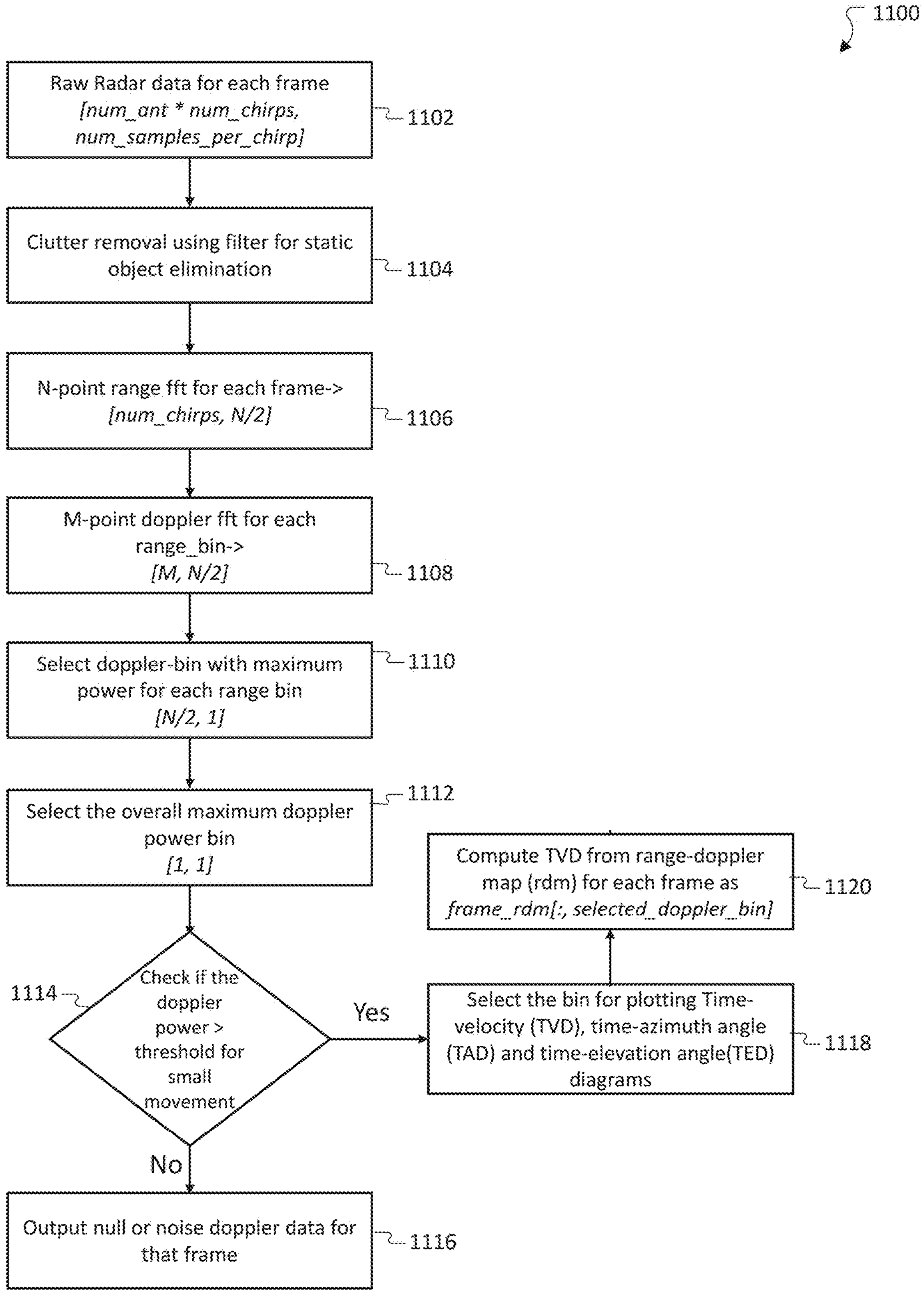
FIG. 11 illustrates an example method of Doppler bin selection and generation of Time Velocity Diagram (TVD), Time Angle Diagram (TAD), and Time Elevation Diagram (TED) signals in accordance with an embodiment of this disclosure.

The processing pipeline 800 is for user localization and fall detection and classification. At block 810, if a radar signal is transmitted, then the radar reflections are received to be processed. At block 820, selection of a Doppler bin is performed, and the selected Doppler bin is used for generation of time-velocity data (TVD), time-azimuthal data (TAD), and time-elevation data (TED). Each of the TVD, TAD, and TED is an example of two-dimensional data. As an example, FIG. 11 shows a method 1100 for selecting the Doppler bin as a function of the maximum Doppler and the generation of the TVD. At block 830, the two-dimensional data is converted to one-dimensional signals 832, for example, TVD is converted to a 1D vector, and TED is converted to another 1D vector. At block 840, the azimuth angle (ϕ) is estimated, which estimate can be based on the TAD. At block 850, a two-dimensional location of the target object (such as user 720) is estimated based on the azimuth angle (ϕ) determined at block 840 and the range $R_0$. Localization of the target object in a two-dimensional range-azimuth plane enables the object range $R_0$ to be measured in a range dimension that can indicate a forward-backward direction relative to the radar 710, and further enables the azimuth angle ϕ of the object to be measured in an azimuthal dimension that can indicate a horizontal (left-right) direction relative to the radar 710. Three dimensional localization of the target object additionally includes an elevation dimension that can indicate a vertical (up-down) direction. At block 860, the elevation angle (θ) is estimated, which estimate can be based on the TED.

At block 870, stop detection is performed to determine whether a stop event (also referred to as a "stop") has occurred. The stop event occurs at a point in time at which the user 720 is potentially not standing or not walking, but the user is down on the floor. The rate of change (Δθ) in the estimated elevation angle is used to detect a "stop." A "stop" is detected if the rate of change (Δθ) of elevation is great enough (for example, greater than a threshold rate).

Every "stop" is not necessarily a fall event. For example, the user may just proceed to sit on the floor or on a low chair. Alternatively, the user may just bend down to pick up something from the floor. Therefore, to distinguish between fall and non-fall activities, a few frames (such as radar frames 602) before and after the stop point may be used to classify fall activities versus non-fall activities. Block 880 represents a machine learning based (ML-based) fall/non-fall activity classifier that processes inputs 872 associated with the detected "stop" and other inputs that the one-dimensional signals 832, thereby generating a classifier prediction 882 as output. In some embodiments, the classifier prediction 882 can be a first value that indicates the "stop" is classified as fall activity, or can be a second value that indicates the "stop" is classified is not fall activity (for example, non-fall activity). For example, the cloud 708 can include the ML-based fall/non-fall activity classifier 880 that receives inputs from the radar 710 and determines whether or not those inputs correspond to fall activity.

Block 890 represents and energy-threshold based false-alarm preventer. At block 890, energy-based fall-alarm prevention is performed based on the inputs 872 associated with the detected "stop" and the classifier prediction 882. That is, the inputs 872 associated with the detected "stop" and the classifier prediction 882 are analyzed to determine a classification 892 of the radar reflections as valid fall activity to be associated with a fall event, or as non-fall activity to be associated with preventing a false fall-alarm. The classification 892 can be used to trigger reporting of a fall event, for example, triggering the relay of the information **722*b*-722*c*** corresponding to the fall event.

Figure 9:
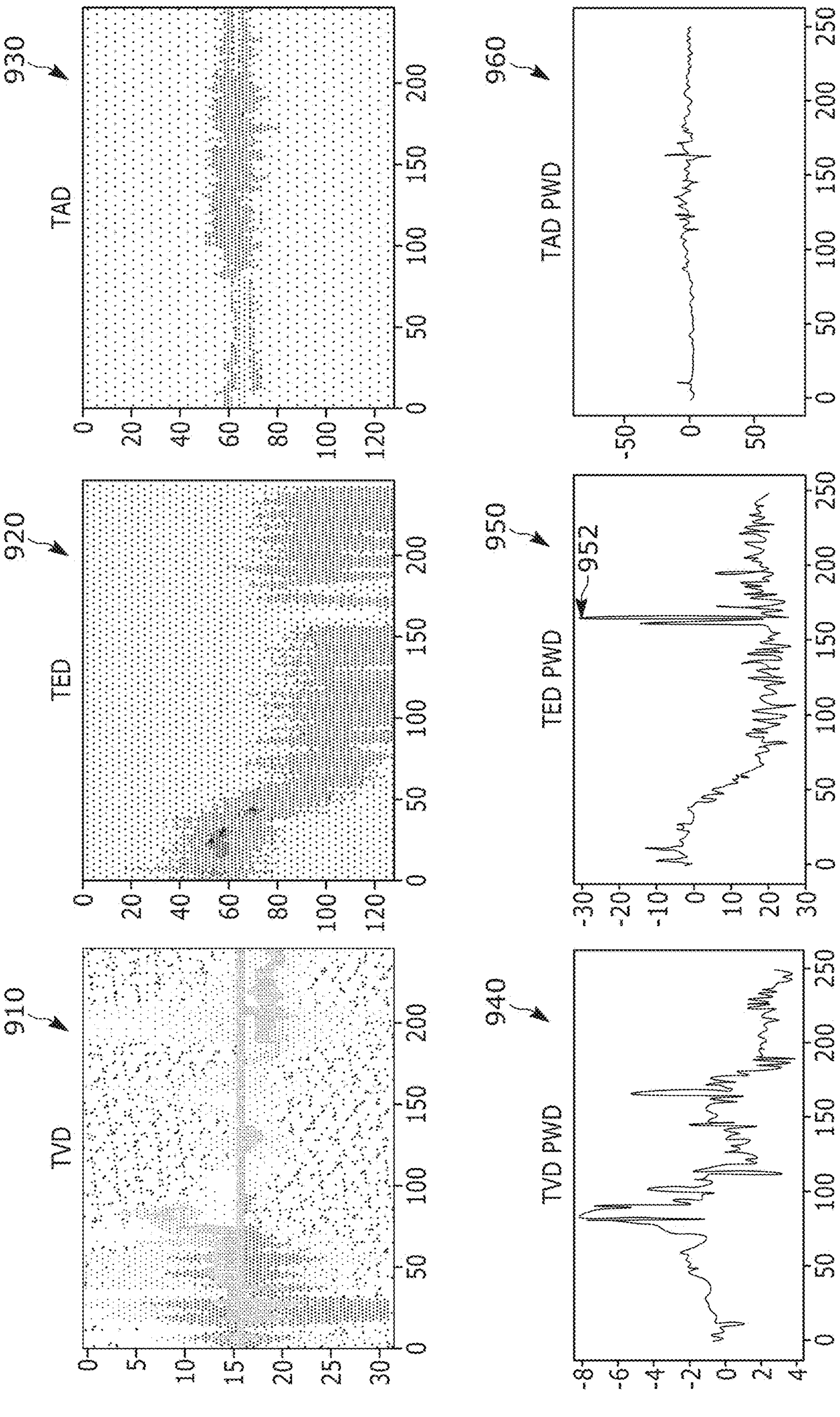
FIG. 9 illustrates examples of features extracted from radar reflections before and after a conversion from two-dimensional data to one-dimensional data in accordance with an embodiment of this disclosure.

FIG. 9 illustrates examples of features extracted from radar reflections before and after a conversion from two-dimensional data to one-dimensional data in accordance with an embodiment of this disclosure. The embodiments of the extracted features 910, 920, 930, 940, 950, and 960 shown in FIG. 9 are for illustration only, and other embodiments could be used without departing from the scope of this disclosure. The two-dimensional extracted features 910, 920, and 930 can be generated at block 820 of FIG. 8. The one-dimensional extracted features 940, 950, and 960 can represent the one-dimensional signals 832 generated at block 830 and of FIG. 8.

The two-dimensional data includes TVD 910, TED 920, and TAD 930 as extracted features. A power-weighted doppler (PWD) is applied to the two-dimensional data to convert the two-dimensional data to one-dimensional data. The TVD 910 is converted to a TVD PWD 940, the TED 920 is converted to a TED PWD 950, and the TAD 930 is converted to a TAD PWD 960 by applying the PWD. More particularly, the TVD PWD 940, TED PWD 950, and TAD PWD 960 are generated as one-dimensional vectors.

The PWD equation that is applied can be expressed as shown in Equation 8, where PWD denotes the centroid of the power across Doppler k for each slow time index n. This PWD helps to envelope the essential signal component and retain the shape of the 2D data when transitioning from 2D data to 1D data. The result is a 1D vector instead of two-dimensional data, which is more resilient to different noise backgrounds. This PWD conversion for generation of one-dimensional data provides technical advantages in the case of large ranges $R_0$, as the sensor parameters such as number of chirps and power per chirp need are varied. This variation of sensor parameters not only increases power of the actual signal, but also increases the noise power. As shown in the two-dimensional data, the increased noise power makes it more difficult to detect the actual signal in the 2D data. As a technical advantage, the PWD captures the actual signal if the actual signal is greater than noise level and displays this actual signal as a 1D vector to make it easier for a classifier (such as the classifier 880 of FIG. 8) to distinguish the shape. Using 1D vectors also reduces computational complexity and training time of the classifier, which is another technical advantage of this conversion from 2D to 1D data. In some embodiments, the value of the peak 952 of the TED PWD 950 represents the estimated elevation angle θ of the target object.

$$PWD[n] = \frac{\sum_{k=-\frac{N}{2}}^{\frac{N}{2}-1} k \cdot TVD[n, k]}{\sum_{k=-\frac{N}{2}}^{\frac{N}{2}-1} TVD[n, k]} \quad (8)$$

To determine the angle of movement (for example at blocks 840 and 860 of FIG. 8), the range FFTs due to all chirps are considered at multiple receiver antennas, for example, RX1-RX3 711-713 of FIG. 7. These receiver antennas are spatially separated along the axis where angular movement will be calculated. In an embodiment of this disclosure, three receiving antennas 711-713 are used that are spatially separated in the horizontal and vertical directions. In this case, RX1 711 is spatially separated from RX2 712 along a vertical axis or in an elevation dimension, and the RX1 711 is spatially separated from RX3 713 along a horizontal axis or in an azimuthal dimension. The data from the two horizontally separated antennas 711 and 713 are used to estimate the azimuth (ϕ) angle of the target object. The two-dimensional time-angle diagram along the horizontal direction is referred to as the TAD, which can be plotted or displayed as a Time Azimuth Diagram as shown at 930 of FIG. 9. Analogously, the data from the two vertically separated antennas 711 and 712 are used to estimate the elevation (θ) angle of the target object. The two-dimensional time-angle diagram along the vertical direction is referred to as the TED, which can be plotted or displayed as a Time Elevation Diagram as shown at 920 of FIG. 9. In this case of spatially separated receiver antennas, the same chirp is received at the different antennas with same magnitude, but received a different phase governed by the separation between the receiving antennas. The difference in phase information can be used to compute angle-vs-time plots of the object (e.g., body of the user 720) using a multiple signal classification (MUSIC) algorithm or other suitable algorithm to extract the angle.

The two-dimensional TVD 910, when the power weighted doppler equation is applied, is converted to one-dimensional TVD, namely, the TVD PWD 940. In an embodiment of this disclosure, the one-dimensional TVD 940 along with one-dimensional TED 950 is used as input features for the CNN classifier, such as the classifier 880 of FIG. 8.

Figure 10:
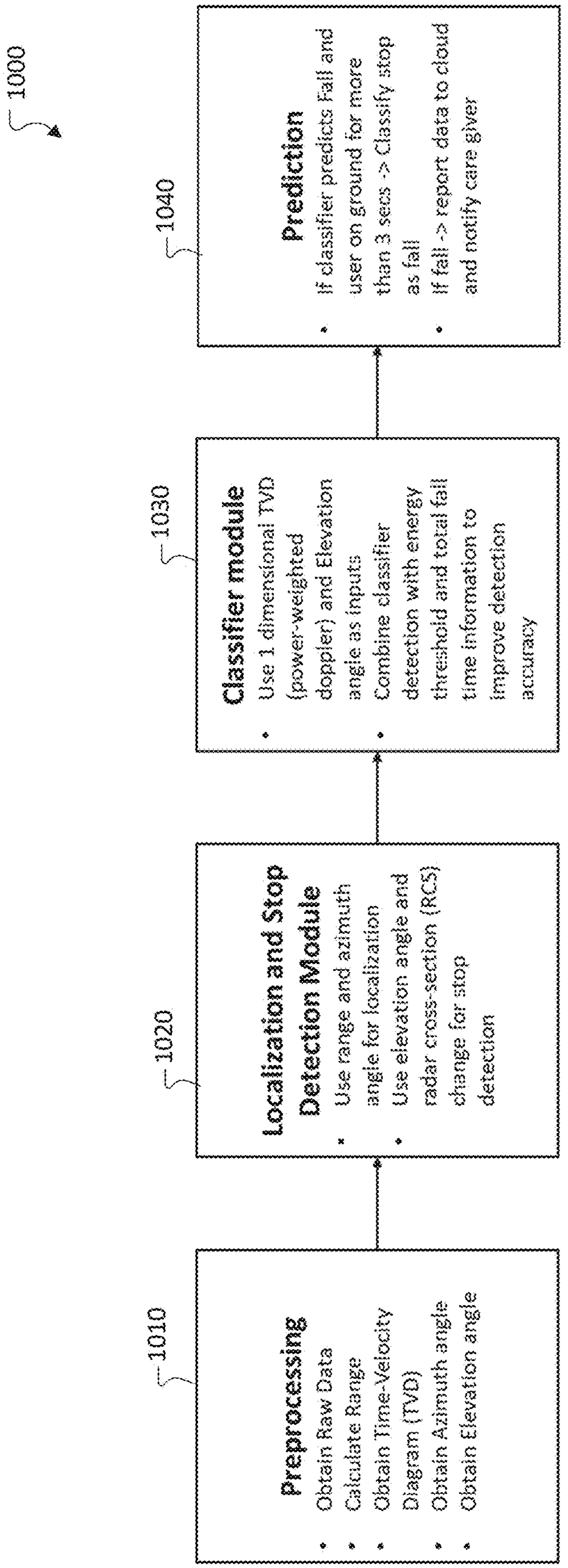
FIG. 10 illustrates an example pipeline of processing modules for fall activity detection from radar raw data in accordance with an embodiment of this disclosure.

FIG. 10 illustrates an example pipeline 1000 of processing modules for fall activity detection from radar raw data in accordance with an embodiment of this disclosure. The embodiment of the pipeline 1000 shown in FIG. 10 is for illustration only, and other embodiments could be used without departing from the scope of this disclosure. The processing modules in the pipeline 1000 of FIG. 10 can be incorporate some of the procedures from processing blocks of the pipeline 800 of FIG. 8, and can be implemented in the electronic device 101 of FIG. 1, the SmartThings app 263 of FIG. 2, or the system 700 of FIG. 7.

In the pipeline 1000, the processing modules include a preprocessing module 1010, a localization and stop detection module 1020, a classifier module ("classifier") 1030, and a prediction module 1040. The preprocessing module 1010 can perform the following procedures: obtain radar raw data; calculate range $R_0$; obtain a time-velocity diagram (such as TVD 910 of FIG. 9); obtain azimuth angle ϕ; and obtain elevation angle θ. The preprocessing module 1010 can perform the same or similar procedures of blocks 810, 820, 840, and 860 of FIG. 8. In some embodiments, the preprocessing module 1010 removes static clutter from the radar raw data, which can be obtained from and generated by the radar 710 of FIG. 7.

The localization and stop detection module 1020 can perform the following procedures: use range $R_0$ and azimuth angle ϕ for localization; use elevation angle θ and change of radar cross-section (RCS) for stop detection. The localization and stop detection module 1020 can perform the same or similar procedures of blocks 850 and 870 of FIG. 8.

The classifier 1030 uses one-dimensional TVD PWD 940 and elevation angle θ as inputs. In some embodiments, the elevation angle θ that the classifier 1030 uses input is estimated based on the value of the peak 952 of the TED PWD of FIG. 9. The classifier 1030 combines classifier detection with energy threshold and total fall time information to improve detection accuracy. That is, the classifier 1030 can determine if a fallen user is getting back up right away, such as within 3-5 seconds following the fall. The classifier 1030 can perform the same or similar procedures as both the ML-based fall/non-fall activity classifier 880 and the energy-threshold based false-alarm preventer 890 of FIG. 8.

The classifier 1030 can be an ML-based fall/non-fall activity classifier that uses a Convolutional Neural Network (CNN) architecture with 11 layers. The input to the classifier 1030 includes the one-dimensional TVD-PWD 940 and one-dimensional elevation angle over time (such as over frame 602) of shapes. As an example, over time can be over radar frames 1 through 150.

The prediction module 1040 can be an energy-threshold-based false-alarm prevention module that is used to improve detection accuracy. The prediction module 1040 can classify a "stop" as a valid fall event if the classifier 1030 predicts a fall of the user and the user remains on the ground (such as the floor) for more than threshold period of time (such as 3 seconds or more). The prediction module 1040 can report data to the cloud and notify a caregiver (such as an attendant) of the user if the detected "stop" is validated as a fall event.

FIG. 11 illustrates an example method 1100 of Doppler bin selection and generation of Time Velocity Diagram (TVD), Time Angle Diagram (TAD), and Time Elevation Diagram (TED) signals in accordance with an embodiment of this disclosure. The embodiment of the method 1100 shown in FIG. 11 is for illustration only, and other embodiments could be used without departing from the scope of this disclosure. The method 1100 can be executed in the in the electronic device 101 of FIG. 1, the SmartThings app 263 of FIG. 2, or the system 700 of FIG. 7, and for ease of explanation will be described as executed by the electronic device 101 of FIG. 1.

Once the signals (i.e., reflections) are received by the receiver antennas, this raw radar data is input to the gesture processing unit located with the mm Wave radar 710. The method 1100 shows a block diagram of the operation of the signal processing unit to generate a classified gesture from the raw radar data. The method 1100 can be referred to as a six-step process.

The first step is acquiring the raw data at each receive antenna. At block 1102, raw radar data for each frame is obtained, for example, as [num_ant*num_chirps, num_samples_per_chirp]. The raw data size is a function of the number of chirps $N_c$ and number of samples per chirp. For example, num_ant can represent the $N_r$ receive antennas 504, can num_chirps can represent the number of chirps $N_c$, and num_samples_per_chirp can represent the number of samples $N_s$ per chirp 506 of FIG. 5. As an example only, to discretize the number of times each signal is quantized, each chirp can be a continual signal that lasts for a 10 microseconds (for example, $T_c$=10 μs), followed by a 10 microseconds gap of no transmission.

In some embodiments, the radar 710 uses a frequency modulated continuous wave (FMCW) radar system to generate and transmit chirps of signal around a center frequency with a bandwidth B. The range resolution of the radar is expressed by Equation (9), where, c is the speed of light. The total range of the radar is determined by a number of samples per chirp and the slope(S) of the chirp. The range of the radar is expressed by Equation (10), where, Fs denotes the sampling rate of the analog to digital converter (ADC) and directly relates to the number of samples $N_s$ per chirp. When an object is within the maximum range of the radar, the reflected signal received by the radar contains information pertaining to the location and velocity of the object. Depending on the number of chirps $N_c$ transmitted and the sampling rate of the ADC 508, each receiving antenna outputs a 3D matrix of data with size [num_chirps*num_samples_per_chirp*num_frames].

$$r = \frac{c}{2B} \tag{9}$$

-continued $$d_{max} = \frac{F_s \cdot c}{2S} \tag{10}$$

At block 1104, clutter removal is performed using filter for static object elimination. It is advantageous to eliminate effects of stationary and slowly moving objects in the vicinity of measurement range of the radar. In some embodiments clutter removal includes applying a zero-Doppler nulling algorithm, followed by a high pass filtering that removes static objects. Based on an assumption that the radar is stationary, the reflected signals from these stationary and slowly moving objects can be filtered out using Zero-Doppler nulling and clutter removal. The Zero-Doppler nulling can simply include setting the values in the zeroth Doppler bin to zero or to the smallest positive representable value in the particular machine's floating point type. The clutter removal filter is implemented using an infinite impulse response (IIR) filter, which uses current and previous inputs and outputs to filter data which does not change in time.

Figure 13:
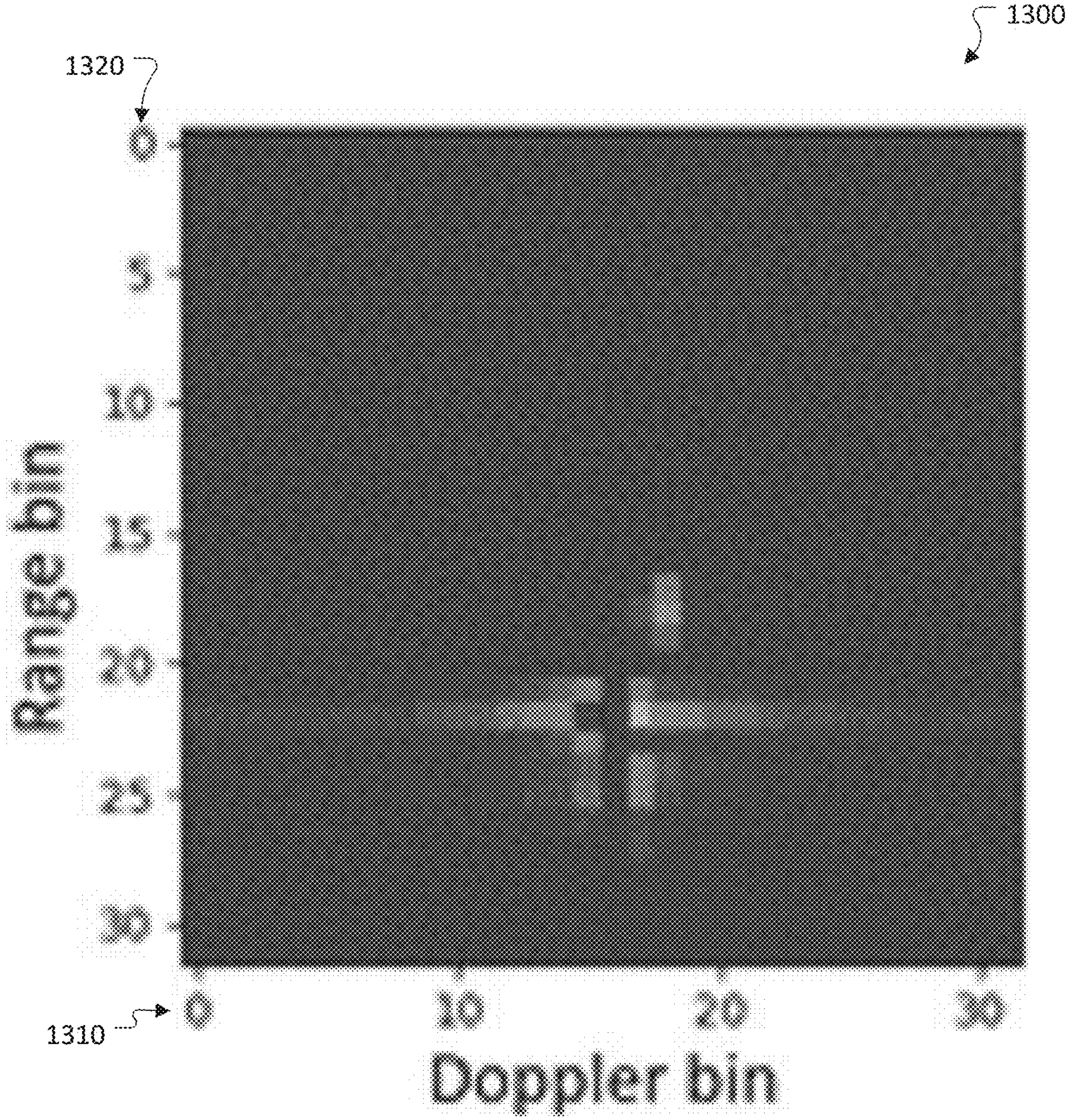
FIG. 13 illustrates an example range-Doppler map (RDM) in accordance with an embodiment of this disclosure.

Once the clutter removal is implemented for filtering stationary objects, a range Doppler map (RDM) 1300 is created as shown in FIG. 13. In the RDM 1300, the x-axis represents Doppler bins 1310, and the y-axis represents range-bins 1320. This RDM 1300 can be created in two steps (blocks 1108 and 1110), by computing a range FFT and Doppler FFT.

Figure 12:
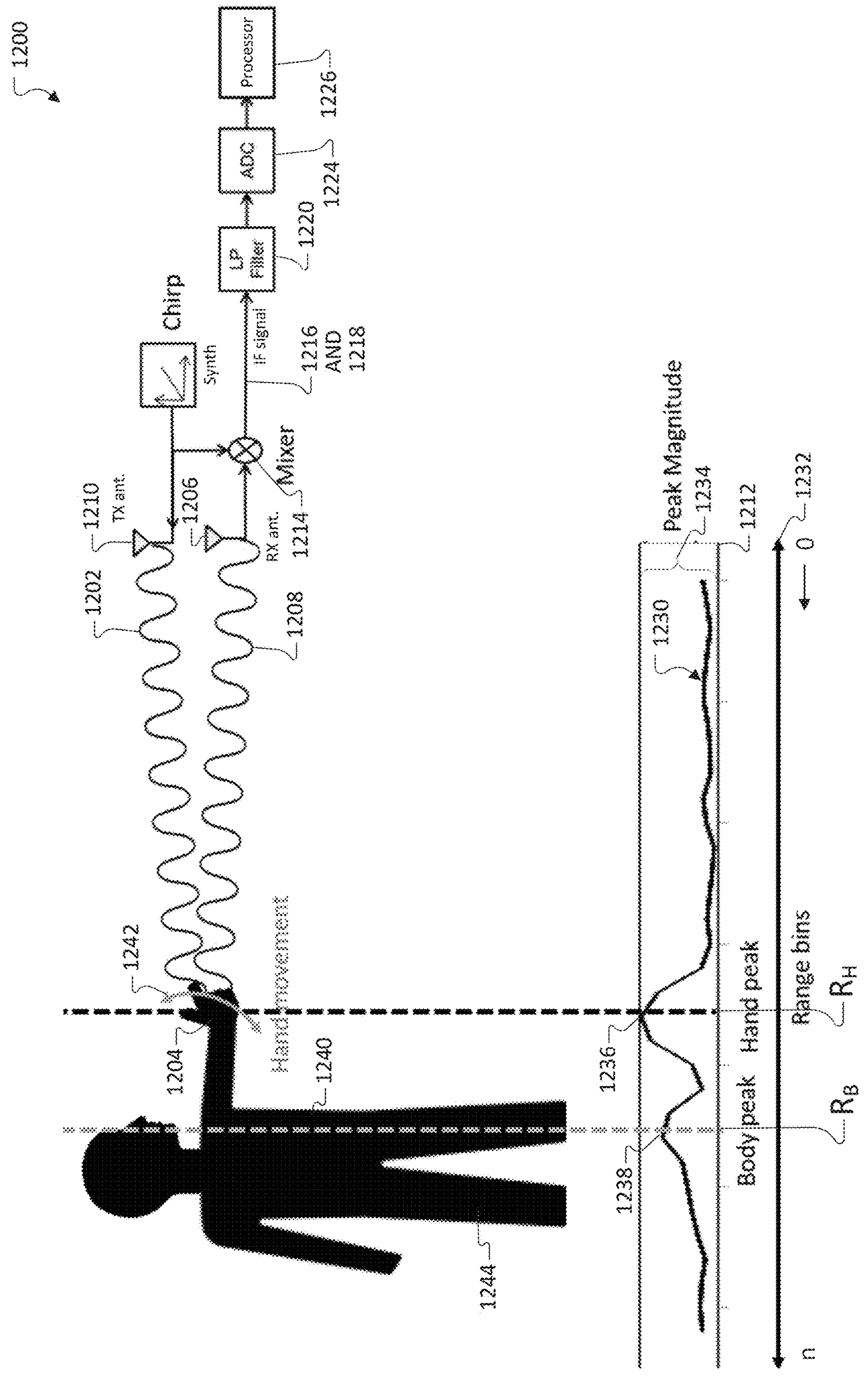
FIG. 12 illustrates an example architecture of a FMCW transceiver system in an electronic device and a range profile corresponding to objects the radar detected, in accordance with an embodiment of this disclosure.

Refer temporarily to FIG. 12. When a chirp 1202 is transmitted and reflects from an object (human hand) 1204, the receiver 1206 receives a delayed version of the chirp. This delayed version of the chirp is referred to as reflections 1208, which the receiver 1206 converts to an electrical signal of raw radar data. The time difference between the transmitted and received chirp is directly proportional to the range $R_0$ of the object. The location of the transmit antenna 1210 is used to define a reference point 1212 (i.e., $R_0$=0) from which the object range can be measured. The differences in the transmitted chirp frequency (f1) and received chirp frequency (f2) is calculated by passing both the chirps (namely, transmitted chirp 1202 and reflections 1208) through a mixer 1214 that establishes an intermediate frequency (IF) which produces an IF mixed signal 1216 with frequency f1+f2, and another IF mixed signal 1218 with frequency f1-f2. When both chirps are passed through a low-pass filter 1220 such that only the signal 1218 having frequency f1-f2 remains, an FFT can be performed on that temporal signal to reveal the frequency value. The ADC 1224 converts the filtered signal to a digital signal that is input to the processor 1226.

The processor 1226 generates a range map by performing FFT for each chirp, for example, each IF mixed signal 1218 with frequency f1-f2 after being filtered and digitized. The processor 1226 generates the RDM 1300 of FIG. 13 by performing FFT at each range-bin among the range-bins 1320. The processor 1226 generates the range profile 1230 by computing an average of the RDM on the doppler axis, for example, the average can be the mean function. The range profile 1230 is plotted relative to an x-axis that represents range bins 1232 and a y-axis that represents the frequency spectrum 1234. The range bins 1232 can be the same as the range bins 1320 of the RDM 1300. Along the range profile 1230, the location of the peaks 1236 and 1238 in the frequency spectrum directly correspond to the range of the objects, such as the range RH of the hand 1204 (e.g., first object) and the range RB of a body 1240 of the human (for example, second object).

Once the range profile 1230 is obtained, the range bin corresponding to the maximum Doppler power is selected. In order to obtain the velocity and angular motion of the hand 1204, Doppler FFT is calculated (as shown at block 1108 of FIG. 11). For the selected range bin, an FFT is calculated for each of the transmitted chirps 1202. In some embodiments, all the chirps will have same peak location (which is the range) but different phase values. This FFT, called Doppler FFT, is used to help to determine the velocity of the object and to construct a Time-Velocity Diagram (TVD).

Refer back to FIG. 11. At block 1106, N-point range fast Fourier transform (FFT) is performed for each frame, for example as [num_chirps, N/2]. For example, the N/2 can represent half of a roundtrip distance from the transmit antenna of the radar to impinge upon the target object and back to the receiver antennas of the radar. The N/2 can represent the object range $R_0$. The range FFT is applied to differentiate between different objects performing movements at different distances (as distinct from velocity considerations) from the radar.

At block 1108, M-point doppler FFT is performed for each range, for example as [M, N/2]. The M can represent a number of points on the body of the user along the elevation dimension. The M points on the body of the user can be arranged in order of the magnitude of reflected power. This doppler FFT is performed to analyze how fast movements of one or more objects are being performed. The doppler FFT includes (as a velocity consideration only, what is distinct from the distance considerations are analyzed in the range FFT.

At block 1110, a doppler-bin with maximum power is selected for each range bin, for example as [N/2, 1]. At block 1112, the overall maximum doppler power bin is selected as [1, 1]. The procedure at block 1112 provides technical advantages, for example, to identify the user who is falling the faster than other users in the room, the overall maximum doppler power bin is selected as a representation of one object that is moving faster than the others among multiple moving objects in the field of view (FoV) of the radar.

At block 1114, a check is performed to determine if the doppler power is greater than a threshold for small movement. The threshold for small movement can be a doppler power value that distinguishes small body-part movement (such as movement of shoulder, wrist, knee, or ankle) from whole-body movement of the user. This check prevents the tracking of objects that are moving a small amount (e.g., remove tracking of hands moving). In the fall detection technology provided in this disclosure, it is desirable to track the whole body, not just a small body-part.

In some embodiments, to prevent the tracking of objects that are moving a small amount (e.g., remove tracking of hands moving) or movement of a small body-part, the threshold for small movement can be a radar cross-section (RCS) power value that distinguishes body-part movement from whole-body movement of the user. As a technical advantage, embodiments of this disclosure exploit the fact that small body-parts like hand or feet have lower RCS than the overall body of the user, and therefore tracks velocity and position of overall body reflection instead of tracking movement of a body-part. In such embodiments, the threshold for small movement can be an RCS reflected power value, and a check can be performed to compare the RCS reflected power to the threshold (for example, to determine if reflected power <threshold) to prevent the tracking of a body-part (such as the hand 1204) that generates an RCS reflected power that is not great enough to be meet or exceed the threshold associated with the RCS of the whole-body.

At block 1116, in response to a determination that the doppler power is not greater than the threshold for small movement, it is determined that the whole body of the user is not moving, null or noise doppler data is output for that frame. In other words, at block 1116, it is determined that the whole body of the user is not moving, which can be a determination that a fall event did not occur.

Alternatively, at block 1118, in response to a determination that the doppler power is greater than the threshold for small movement, a bin is select for plotting time-velocity (TVD), time-azimuth angle (TAD) and time-elevation angle (TED) diagrams. In other words, at block 1118, it is determined that the whole body of the user is moving. At block 1120, a TVD is computed from a range-doppler map (RDM) for each frame as frame_rdm [:, selected_doppler_bin]. The method 1100 can be referred to as a six-step process, wherein blocks 1102, 1104, 1106, 1108, 1110, 1118, and 1120 represent steps 1-7, respectively.

FIG. 12 illustrates an example architecture of a FMCW transceiver system in an electronic device 1200 and a range profile 1230 corresponding to objects (hand 1204 and body 1240) the radar detected, in accordance with an embodiment of this disclosure. The embodiments of the electronic device 1200 and range profile 1230 shown in FIG. 12 are for illustration only, and other embodiments could be used without departing from the scope of this disclosure. The FMCW transceiver system within the electronic device 1200 can be or can operate the same as or similar to the FMCW transceiver system 500 illustrated in FIG. 5. To avoid duplication, the description of FIG. 12 described above with blocks 1106-1108 of FIG. 11 will not be reproduced below.

In this example, the hand 1204 of the user is moving vertically or waving up and down in a direction 1242. The arm of the user is extended away from the body 1240 such that the location of the radar (at $R_0=0$ or within range bin 1232) is closer to the hand 1204 than to the body 1240 ($R_H<R_B$). Embodiments of this disclosure can differentiate between the hand 1204 and the body 1240, which are performing movements at different distances $R_H$ and $R_B$.

Movement of a body-part that moves quickly, such as waving of the hand 1204, can be generate a greater doppler power than movement of the body 1240 that moves slower. The threshold for small movement can be used to prevent tracking movement of a body-part that generated a Doppler power outside of a specified range of Doppler power associated with fall events. The legs section 1244 of the body generates more reflections than a head section (also referred to as upper section) of the body, and accordingly generates a greater RCS than the head section.

FIG. 13 illustrates an example RDM 1300 in accordance with an embodiment of this disclosure. The embodiment of the RDM 1300 shown in FIG. 13 is for illustration only, and other embodiments could be used without departing from the scope of this disclosure. To avoid duplication, the description of FIG. 13 described above with blocks 1106-1108 of FIG. 11 will not be reproduced below.

Figure 14:
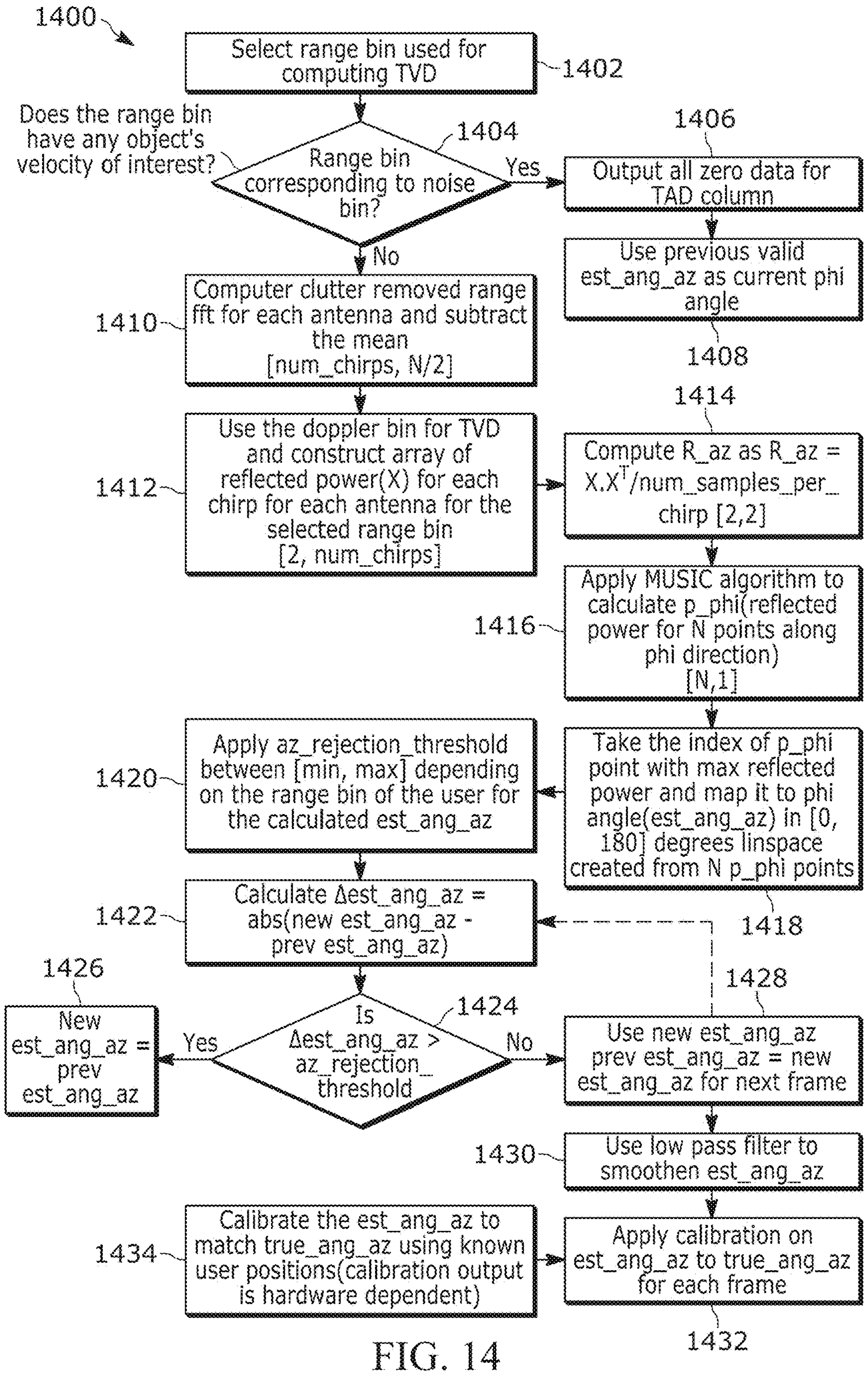
FIG. 14 illustrates an example method for computing an azimuth angle and performing smoothing in accordance with an embodiment of this disclosure.
Figure 15:
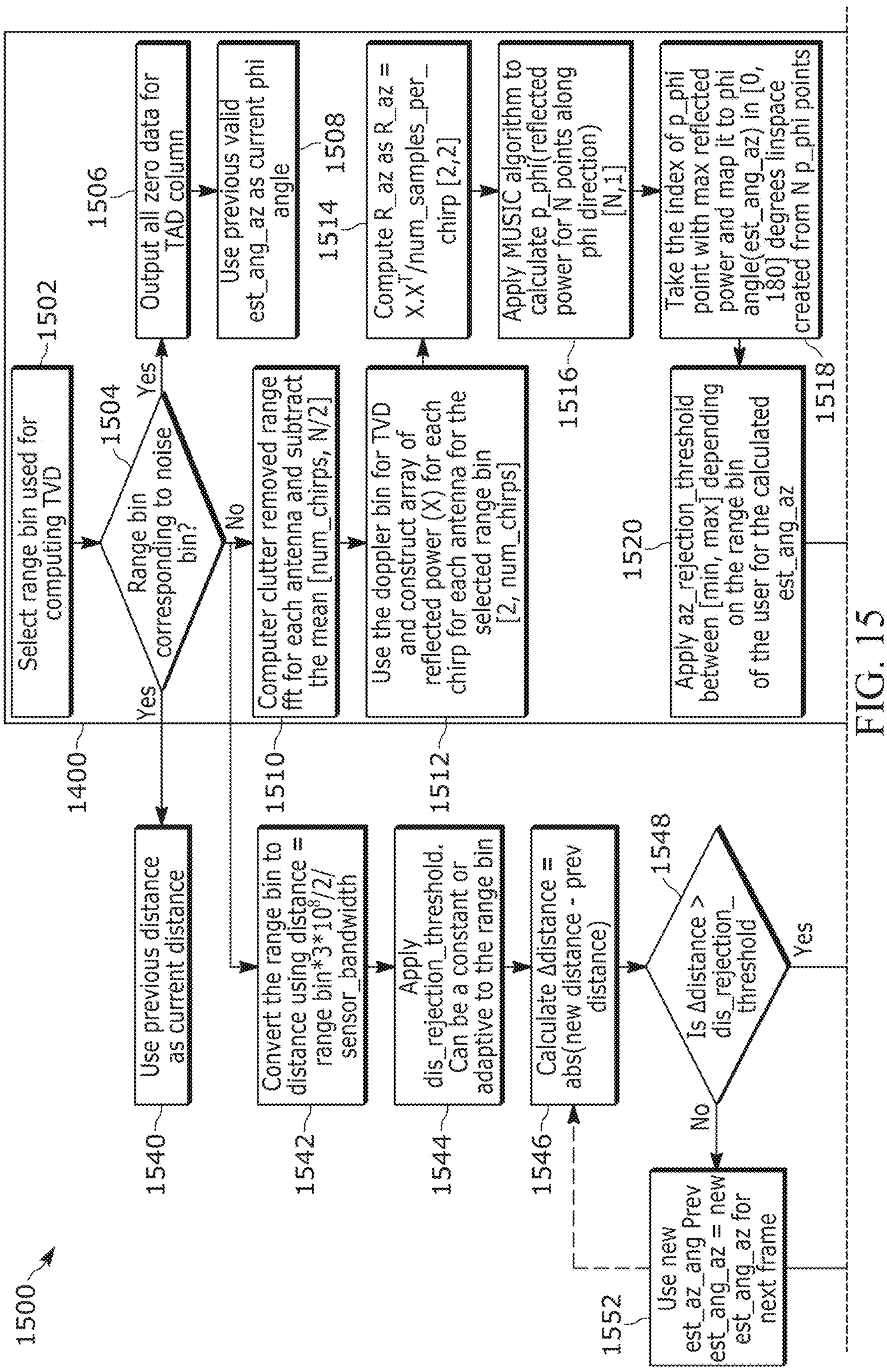
FIG. 15 illustrates an example method for calculating localization, azimuth angle, and range along with smoothing in accordance with an embodiment of this disclosure.
Figure 15:
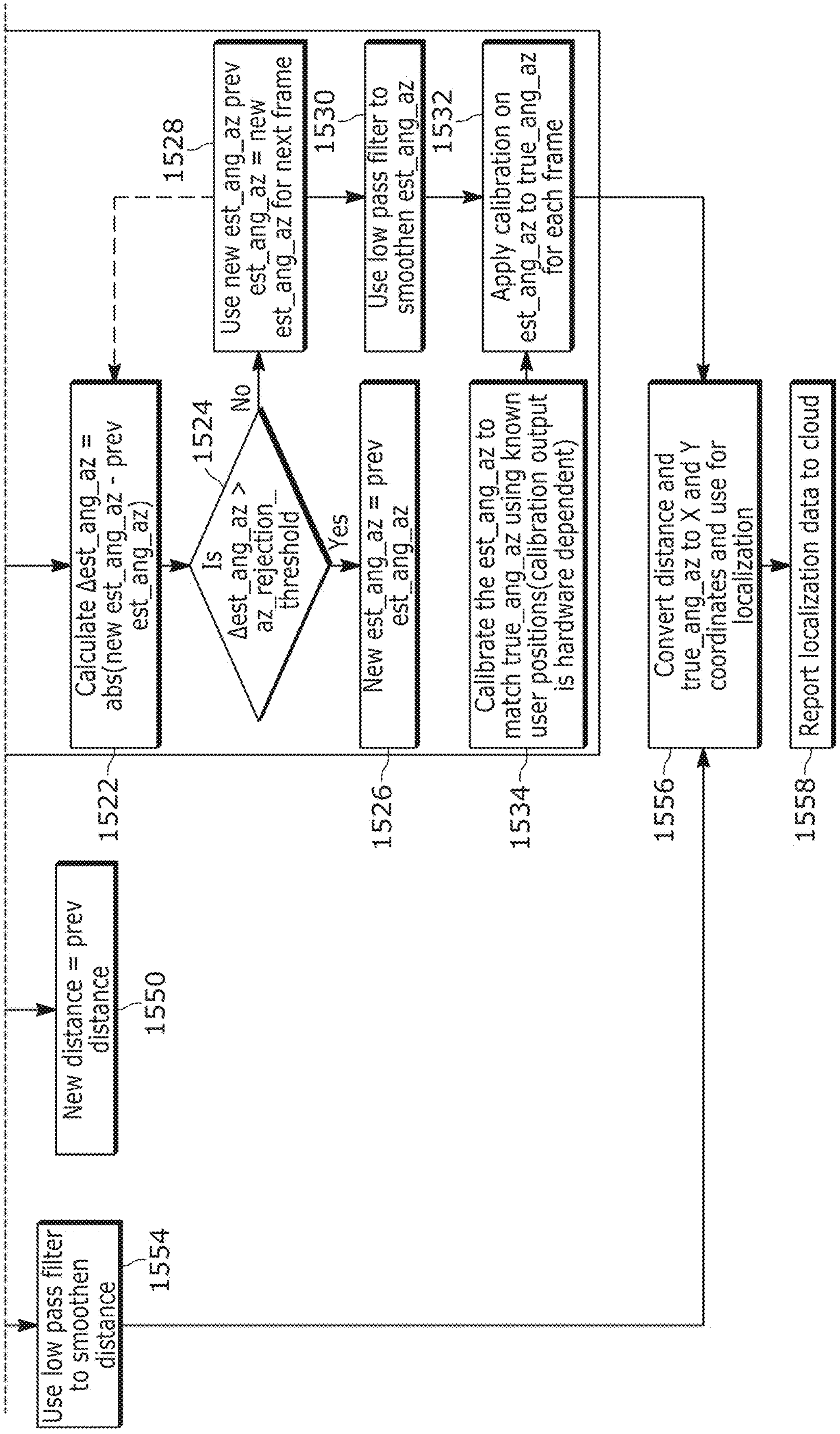
Figure 16:
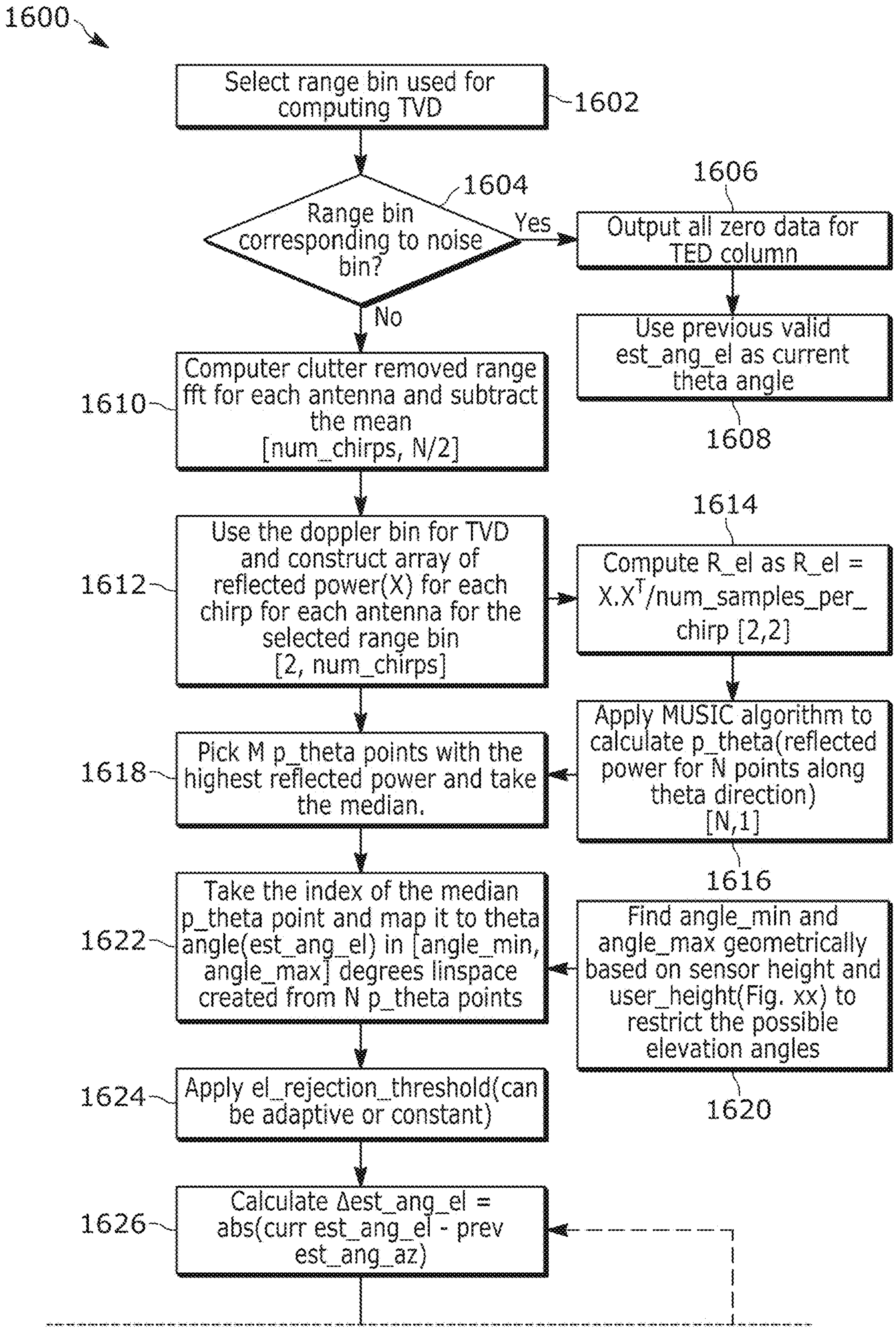
FIG. 16 illustrates an example method for calculating elevation angle with filtering and stop-detection in accordance with an embodiment of this disclosure.
Figure 16:
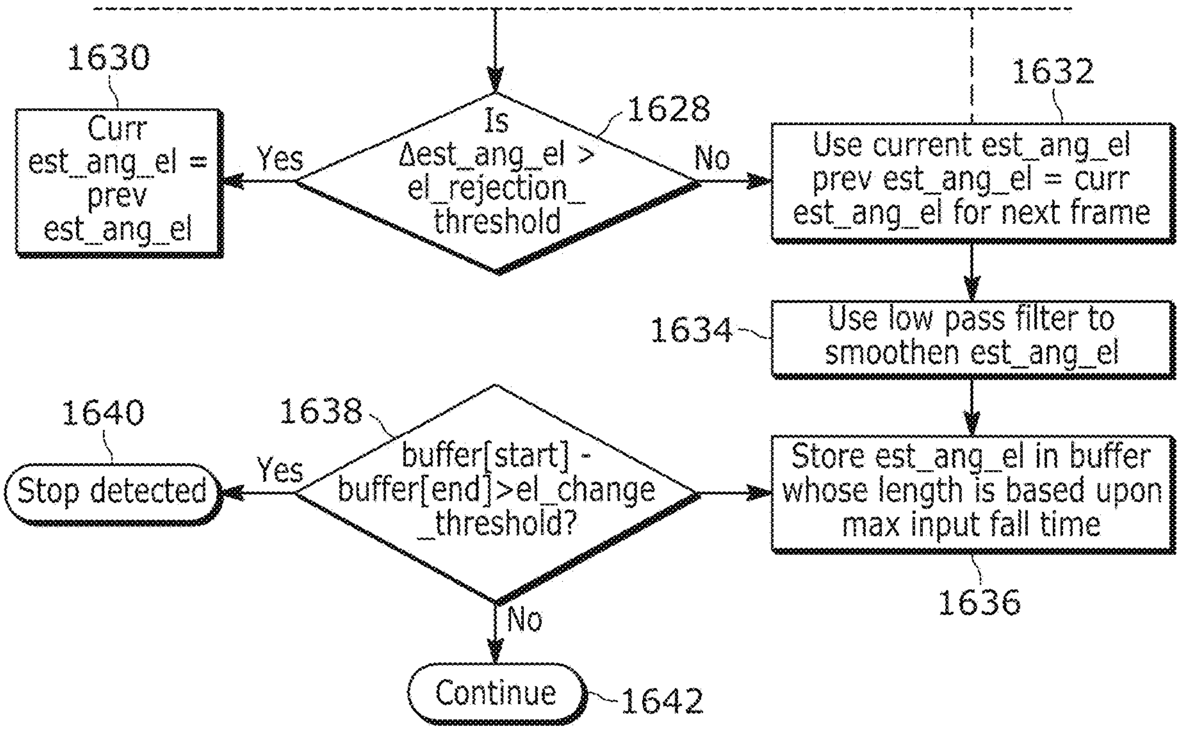

FIGS. 14-16 illustrate methods that can be executed in the electronic device 101 of FIG. 1, the SmartThings app 263 of FIG. 2, or the system 700 of FIG. 7, and for ease of explanation will be described as executed by the electronic device 101 of FIG. 1. FIG. 14 illustrates an example method 1400 for computing an azimuth angle and performing smoothing in accordance with an embodiment of this disclosure. The embodiment of the method 1400 shown in FIG. 14 is for illustration only, and other embodiments could be used without departing from the scope of this disclosure.

The method 1400, namely, the procedures for computing the azimuth (Ø) angle, follows the selection of the Doppler bin. For example, the method 1400 can start after block 820 of FIG. 8, at which Doppler bin selection is performed. As another example, the method 1400 can start after block 1112 of FIG. 11, at which selection of the Doppler bin is executed. The method 1400 can be included within the procedures of block 840 of FIG. 8, or can be included in the preprocessing module 1010 of FIG. 10.

At block 1402, electronic device 101 selects a range bin to be used for computing TVD. The range data may fluctuate, for example, as the target object moves. A simple moving average filter along with outlier rejection may be employed to obtain consistent and smooth range data over time (for example, over one or more frames 602). The range of the target object is determined from the range bin using the Equation 11, which is derived from the above-described Equation 9.

$$\text{range} = \text{range-bin} \times \frac{c}{2B} \tag{11}$$

At block 1404, if the electronic device 101 determines that the range bin (as selected at block 1402) corresponds to a noise bin, then the method 1400 proceeds to block 1406 at which all zero data is output for TAD column. At block 1408, electronic device 101 uses the previous valid est_ang_az as the current q angle. For example, the value of the current estimated azimuth angle (q) is updated to keep the same value as the previous valid estimated azimuth angle, instead of wastefully consuming computing resources to calculate a new azimuth angle based on a noise bin.

Alternatively, at block 1410, in response to a determination that the range bin does not correspond to a noise bin, the electronic device 101 computes clutter removed range FFT for each antenna and subtracts the mean, such that [num_chirps, N/2].

At block 1412, the electronic device 101 uses the doppler bin for TVD and constructs an array of reflected power (X) for each chirp for each antenna for the selected range bin, such that [2, num_chirps].

At block 1414, the electronic device 101 computes R_az as $R\_az=X.X^T/num\_samples\_per\_chirp$, such that [2, 2].

At block 1416, the electronic device 101 applies a MUSIC algorithm to calculate p_phi (reflected power for N points along the azimuth (φ) direction, such that [N, 1].

At block 1418, the electronic device 101 takes the index of p_phi point with maximum reflected power, and maps that index of p_phi point to an estimated azimuth angle (est_ang_az) in the [0, 180] degrees linespace created from Np_phi points. For example, azimuth angles having values in the range from +90° through −90° are converted to values in the range from 0 through 180 degrees.

At block 1420, the electronic device 101 can apply az_rejection_threshold between [min, max] depending on the range bin of the user for the calculated est_ang_az. As a technical solution, the electronic device 101 rejects large movements that cannot physically happen. Particularly, there are physical limits on how quickly a human body can move azimuthally in the interval between consecutive chirps, and an estimate of this maximum change of azimuthal angle can be used as the az_rejection_threshold.

At block 1422, the electronic device 101 can calculate Δest_ang_az=abs (new est_ang_az-prev est_ang_az).

At block 1424, if the electronic device 101 determines that Aest_ang_az>az_rejection_threshold, then the method 1400 proceeds to block 1426 at which a new estimated azimuth angle is set equal to the previous estimated azimuth angle, such that New est_ang_az=prev est_ang_az).

Alternatively, at block 1428, in response to a determination that that Aest_ang_az>az_rejection_threshold is FALSE, then the electronic device 101 can use new est_az_ang to update the previous estimated azimuth angle for the next frame to have the value of the new estimated azimuth angle, such that Prev est_ang_az=new est_ang_az for the next frame.

At block 1430, the electronic device 101 can use a low pass filter to smoothen the est_ang_az. At block 1432, the electronic device 101 can apply calibration on est_ang_az to true_ang_az for each frame. At block 1434, the electronic device 101 can calibrate the est_ang_az to match true_ang_az using known such as (previously tracked and stored values of) user positions, thereby calibration output is hardware dependent.

In the method 1400, a smoothing averaging filter along with outlier rejection is used to obtain a consistent and smooth estimate of the azimuth angle over time, thereby tracking the azimuth angle of the user over time. The azimuth angle determined in this method 1400 is relative, for example, as shown at blocks 1422-1434. To help convert the estimated relative azimuth angle to absolute (true) azimuth angle within an environment (such as a living room), a simple calibration step is used during the initial setup. The data from the calibration is used to convert the estimated relative azimuth angle (also referred to as est_ang_az) to true azimuth angle (also referred to as true_ang_az). This conversion (or mapping) procedure can be implemented using a simple look up table (LUT). The range along with the azimuth angle at each time instant is used to compute the location of the target object (such as the user 720), as described further below with the method 1500 in FIG. 15.

FIG. 15 illustrates an example method 1500 for calculating localization, azimuth angle, and range along with smoothing in accordance with an embodiment of this disclosure. The embodiment of the method 1500 shown in FIG. 15 is for illustration only, and other embodiments could be used without departing from the scope of this disclosure.

In an embodiment, the method 1500 is executed concurrently with the method 1400 of FIG. 14. The procedures of blocks 1502-1534 in FIG. 15 are identical to as or similar to the procedures blocks 1402-1434 of FIG. 14 of FIG. 14, and descriptions are not duplicated in this disclosure. In the embodiment shown, the method 1500 incorporates an entirety of the method 1400, and accordingly, blocks 1502-1534 can be or can represent blocks 1402-1434 of FIG. 14, and are grouped as the method 1400 for ease of description.

At block 1540, the electronic device 101 can use previous distance as current distance. At block 1542, in response to a determination that the range bin does not correspond to a noise bin, the electronic device 101 can convert the range bin to distance, for example, using Equation 11, as described above. The speed of light is used to calculate distance.

At block 1544, the electronic device 101 can determines if a second user has entered into the FOV of the radar (for example, entered into the room where the first user 720 is being tracked). More particular, the electronic device 101 can apply a distance rejection threshold (dis_rejection_threshold), which can be a constant value or a value adaptive to the range bin selected at block 1502. As a technical advantage, in order to prevent tracking of multiple users, the distance rejection threshold enables the electronic device 101 to continue tracking the first user while avoiding tracking the second. That is, in order to prevent tracking of the second user, the electronic device 101 can reject (such as filter out) radar data associated that is farther from the converted distance (as converted at block 1542 and associated with the first user) than the distance rejection threshold. Radar data associated with the second user's range is rejected as being outside of a vicinity associated with the first user.

At block 1546, the electronic device 101 can calculate a change of distance associated with the user (namely, the first user 720), such that Adistance=abs (new distance-prev distance).

At block 1548, the electronic device 101 can determine if a condition defined by the distance rejection threshold is satisfied by determining if Δdistance>dis_rejection_threshold. At block 1550, the electronic device 101 can, in response to an affirmative determination that the distance rejection threshold condition is satisfied, set or update the new distance to have the value of the previous distance, such that New distance=prev distance.

At block 1552, in response to a determination that the distance rejection threshold condition is not satisfied, the electronic device 101 can set Prev est_ang_az=new est_ang_az for next frame. In other words, the electronic device 101 can use a new estimated azimuth angle (new est_az_ang) as the previous estimated azimuth angle (Prev est_ang_az) for the next frame. At block 1554, the electronic device 101 can use a low pass filter to smoothen distance.

The method 1500 proceeds to block 1556 from block 1554 or from block 1532. At block 1556, the electronic device 101 can convert distance and true_ang_az to X and Y coordinates and use for localization. For example, the X and Y coordinates can be the two-dimensional location estimation in the azimuthal-range plane as described with block 850 of FIG. 8. At block 1558, the electronic device 101 can report localization data to the cloud (such as cloud 708 of FIG. 7).

FIG. 16 illustrates an example method 1600 for calculating elevation angle with filtering and stop-detection in accordance with an embodiment of this disclosure. The embodiment of the method 1600 shown in FIG. 16 is for illustration only, and other embodiments could be used without departing from the scope of this disclosure.

The method 1600 includes procedures for calculating elevation angle and the stop point as a function of the elevation angle. In an embodiment, the method 1600 is executed concurrently with the method 1400 of FIG. 14. In the embodiment shown, the method 1600 incorporates a partial (less than an entirety) of the method 1400. The procedures of blocks 1602-1616 in FIG. 16 are identical to as or similar to the procedures blocks 1402-1416 of FIG. 14, and descriptions are not duplicated in this disclosure.

At block 1618, the electronic device 101 can determine that the whole body of the is represented by a plurality of pseudo-spectrum points at each of which an elevation angle is determined. In this disclosure, the term "p_theta" means the power of one point in the theta direction, which is a vertical direction along the elevation dimension. For simplicity, the pseudo-spectrum points are also referred to as p_theta points. The embodiments of this disclosure include a total of N p_theta points, which define a vector. As an example, N can be equal to 32. To reduce computational complexity, the electronic device 101 can represent the whole body using a reduced the number of points by selecting, from among the plurality of points, a subset of M p_theta points to represent the whole body. The M points includes multiple points, which can be the M p_theta points that have the greatest reflected power among the plurality of points. As a technical advantage, to further reduce computational complexity, the electronic device 101 can represent the whole body using a single p_theta point by determining a median reflected power of the M points, and selecting the single p_theta point associated with the median reflected power.

Figure 17:
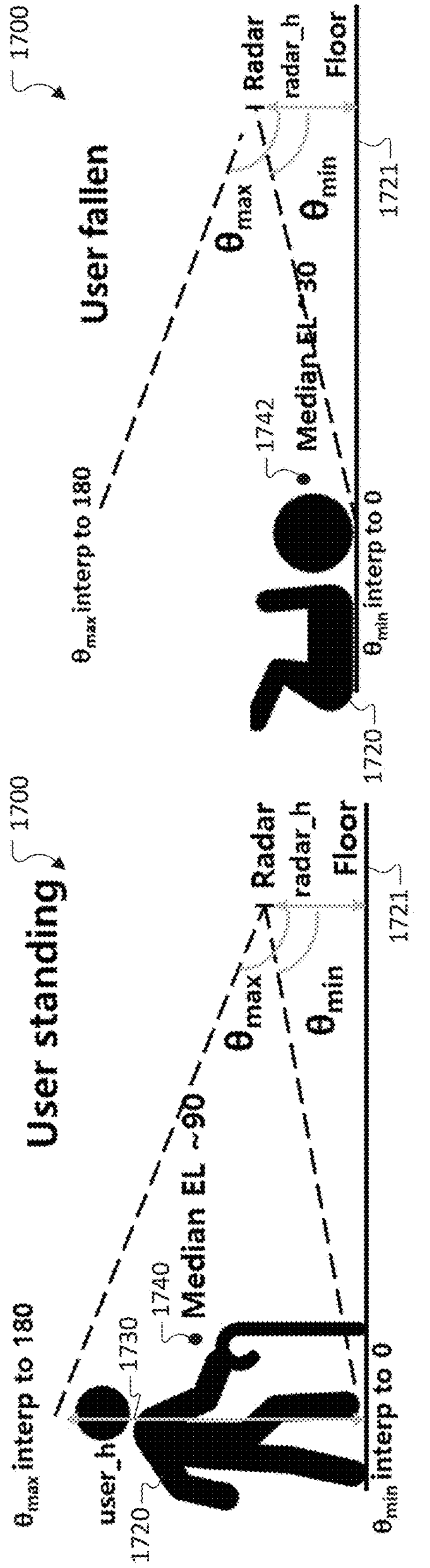
FIG. 17 illustrates an example environment including a user standing before an occurrence of fall event and the fallen user after the fall event occurred, as rationale for using elevation angle change for stop detection in accordance with an embodiment of this disclosure.

At block 1620, the electronic device 101 can restrict the possible elevation angles by determining a minimum angle (angle_min or $\theta_{min}$) and a maximum angle (angle_max or $\theta_{max}$) geometrically based on height of the radar sensor (radar_h) and height of the user (user_height), as shown in FIG. 17. For example, when the user is standing, the maximum angle $\theta_{max}$ corresponds to the height of the user, and the minimum angle $\theta_{min}$ corresponds to the floor where the feet of the user are located.

At block 1622, the electronic device 101 can perform an interpolation algorithm as a technical solution to improve the classifier's (880, 1030) ability to distinguish the elevation angles associated with two adjacent p_theta points (for example, two consecutively indexed p_theta points). This interpolation algorithm can be understood more easily in view of FIG. 17. This interpolation algorithm adds finer granularity to the differences between elevation angles of each of the N p_theta points by exploiting the range of elevation angles that the radar sensor 710 can detect from 0° to 180° (which is the same as from −90° to)+90°. The electronic device 101 interpolates the possible elevation angles [$\theta_{min}$, $\theta_{max}$] of the user to the possible elevation angles [0°, 180°] of the radar's elevation dimension, and similarly interpolates angles in between. More particularly, the electronic device 101 can identify the index of the single p_theta point associated with the median reflected power, and map the index to an elevation angle (also referred to as median elevation angle $\theta_{median}$ or as est_ang_el) that is between [angle_min, angle_max] degrees based on a linespace (1730 of FIG. 17) created from N p_theta points. The linespace 1730 spans along the radar's elevation dimension from the floor to the height of the user at the top of the user's head. Depending on the height of the user, this elevation angle (est_ang_el) of the single p_theta point associated with the median reflected power can be approximately 90°, indicating that the height of the single p_theta point above the floor is approximately the same as the height of the radar sensor (radar_h).

At block 1624, the electronic device 101 can apply an elevation rejection threshold (el_rejection_threshold), which can be a constant value or a value that is adaptive. As a technical advantage, the electronic device 101 can reject an estimated elevation angle that does not satisfy a condition that is defined by the elevation rejection threshold, for example, if reject and estimated elevation angle that is less than $\theta_{min}$ or greater than $\theta_{max}$.

At block 1626, the electronic device 101 can calculate Δest_ang_ael=abs (curr est_ang_el-prev est_ang_az). At block 1628, the electronic device 101 can determine whether to reject a change of estimated elevation angle (Δest_ang_el) based on whether the change of estimated elevation angle satisfies a condition that is defined by the elevation rejection threshold. For example, the condition can be defined as and satisfied if Δest_ang_el>el_rejection_threshold. The method 1600 proceeds to block 1630 if the elevation rejection threshold condition is satisfied, but proceeds the method 1600 to block 1632 if the elevation rejection threshold condition is not satisfied.

At block 1630, the electronic device 101 can reject the current estimated elevation angle, and maintain use of the value of the previous estimated elevation angle, for example by setting Curr est_ang_el=prev est_ang_el. At block 1632, the electronic device 101 can use the current estimated elevation angle as the previous estimated elevation angle for the next frame, such that Curr est_ang_el=prev est_ang_el for the next frame, thereby not rejecting the current estimated elevation angle.

At block 1634, the electronic device 101 can use a low pass filter to smoothen the estimated elevation angle (est_ang_el). At block 1626, the electronic device 101 can store est_ang_el in a buffer that has a length is based upon a specified limit of time (such as a maximum input fall time). At block 1638, the electronic device 101 can determine whether an elevation-change threshold condition is satisfied, for example, which is satisfied if buffer [start]-buffer [end] >el_change_threshold is TRUE. At block 1640, the electronic device 101 can detect a "stop" event based on a determination that the elevation-change threshold condition is satisfied. At block 1642, in response to a determination that the elevation-change threshold condition is not satisfied, the electronic device 101 can determine that a "stop" event is not detected and can continue tracking the elevation angle and change of elevation of the user.

FIG. 17 illustrates an example environment 1700 including a user standing before an occurrence of fall event and the fallen user after the fall event occurred, as rationale for using elevation angle change for stop detection in accordance with an embodiment of this disclosure. The embodiment of the environment 1700 shown in FIG. 17 is for illustration only, and other embodiments could be used without departing from the scope of this disclosure. The environment 1700 can represent the room within which the radar 710 of FIG. 7 operates and is installed at a height (radar_h) above the floor 1721. The environment 1700 can represent the field of view (FoV) of the radar 710. Accordingly, the user 1720 and floor 1721 can represent the corresponding user 720 and floor 721 of FIG. 7, respectively.

Before the fall event, the user 1720 is standing in a FoV of the radar 710 that determines the height (user_h) of the user standing and creates a linespace 1730 that is defined from the bottom of the user's feet to the top of the user's head. The height (user_h) of the standing user can be divided into N=32 vertical bins, which can be represented by the plurality of N=32 p_theta points, respectively. The N points can be indexed (from i=0 through i=N−1) such that the linespace 1730 can include a first p_theta point corresponding to the user's feet standing on the floor 1721 at the minimum elevation angle $\theta_{min}$, such as −60° relative to the location of the radar sensor). The Nth p_theta point can correspond to the top of the user's head at the maximum elevation angle $\theta_{max}$, such as +30° relative to the location of the radar sensor). As an example, a possible range of angles between [−60°, +30°] can be interpolated to the range [0°, 180°]. The linespace 1730 includes the single p_theta point 1740 associated with the median reflected power. However, for ease of illustration, this point 1740 is shown in front of the body of the user at the median elevation angle $\theta_{median}$, which can be approximately 90° post-interpolation.

The radar sensor 710 detects a change of elevation angle during and after the user 1720 has fallen in the environment 1700, in accordance with an embodiment of this disclosure. While the fallen user 1720 is on the floor 1721, the single p_theta point 1742 associated with the median reflected power corresponds to at a median elevation angle $\theta_{median}$, which can be approximately 30° post-interpolation.

In experiments, it has been observed that the estimated elevation angle θ may be noisy, especially when the user 1720 is very close to the radar 710, for example, when the object range $R_0$ is less than threshold distance. To improve the ability to filter noise out, the interpolation procedure of block 1622 of FIG. 16 is applied to increase granularity of the elevation angles corresponding to the p_theta points.

Figure 18:
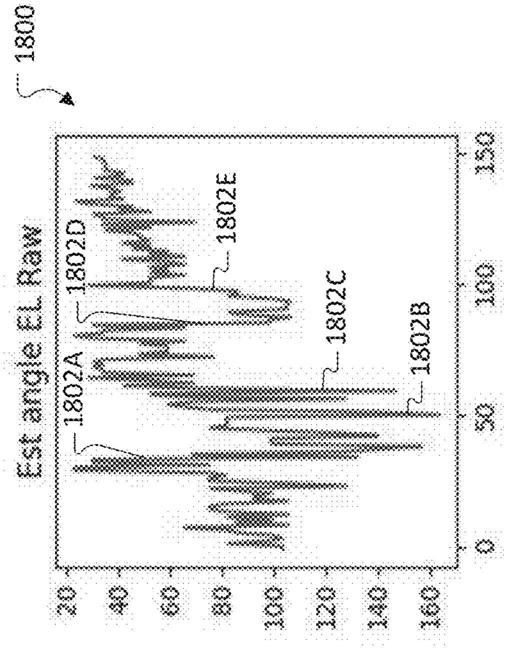
FIG. 18 illustrates example graph of post-interpolation elevation angle calculated based on peak power bin in accordance with an embodiment of this disclosure.

FIG. 18 illustrates example graph 1800 of post-interpolation elevation angle calculated based on peak power bin in accordance with an embodiment of this disclosure. The y-axis represents the elevation angle between a $\theta_{min}$−0° to $\theta_{max}$=180°, and the x-axis represents time (for example, radar frames 602) The embodiment of the graph 1800 shown in FIG. 18 is for illustration only, and other embodiments could be used without departing from the scope of this disclosure. The graph 1800 shows raw angle of elevation data after conversion from two-dimensional TED to one-dimensional TED. Some radar frames (indexed along the x-axis) may be associated with an example rejected change of elevation angle 1802*a*-1802*e* that fails one or more conditions, which are defined based on the elevation angle rejection threshold.

Figure 19:
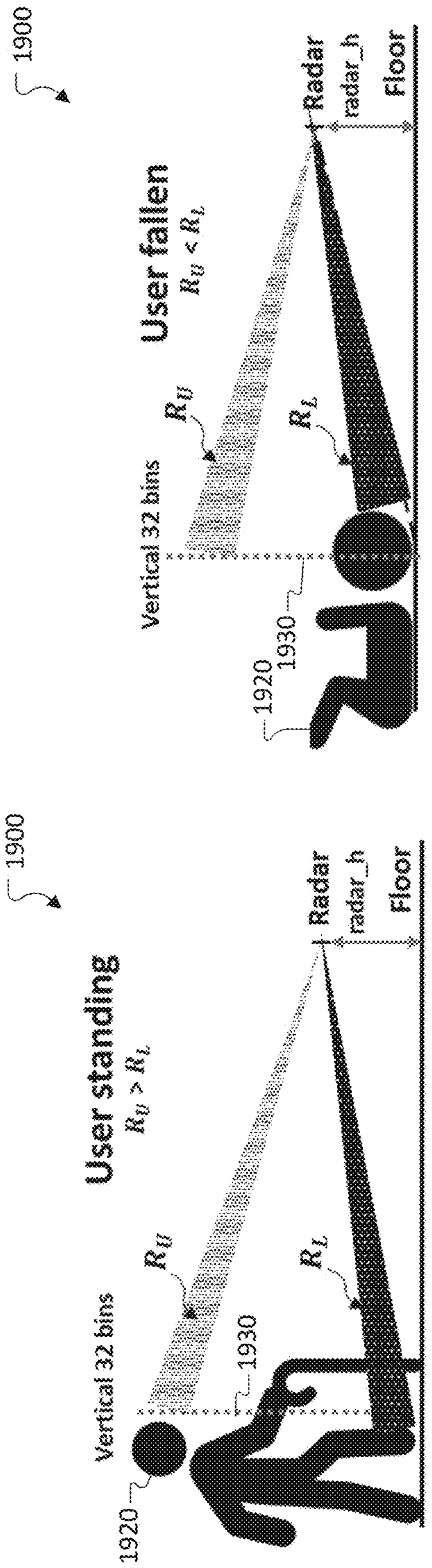
FIG. 19 illustrates an example environment including a user before and after a fall event, as rationale for using a pseudo-spectrum (p_theta) directly for stop detection in accordance with an embodiment of this disclosure.

FIG. 19 illustrates an example environment 1900 including a user 1920 before and after a fall event, as rationale for using a pseudo-spectrum (p_theta) directly for stop detection in accordance with an embodiment of this disclosure. More particularly, the environment 1900 shows that the user has fallen in a field of view of a radar that detects a pseudo-spectrum. The embodiment of the environment 1900 shown in FIG. 19 is for illustration only, and other embodiments could be used without departing from the scope of this disclosure.

In the environment 1900, the radar 710 of FIG. 7 operates and is installed at a height (radar_h) above the floor in a similar manner as described above in the environment 1700 of FIG. 17. The user 1920 and linespace 1930 can be the same as the corresponding user 1720 and linespace 1730 of FIG. 17. The plurality of N=32 p_theta points can be indexed in the same manner as described above in the environment 1700 of FIG. 17.

However, the radar sensor 710 in the environment 1900 operates differently than the radar operates in FIG. 17. As a comparison of the two different techniques to determine the elevation angle and change of elevation angle, in the radar sensor 710 in the environment 1900 in applies a technique based on a change of radar cross section (RCS) in a particular direction, however, the radar sensor 710 in the environment 1700 of FIG. 17 applies a technique based on a peak power bin (namely, the single p_theta point associated with the median reflected power).

To reduce computational complexity, the electronic device 101 can avoid determining an elevation angle that represents the whole body, and instead determine at least two RCSs that respectively correspond to an upper-region and to a lower-region of the body (such as the head region and food region of the user). From among the N points corresponding to the N=32 vertical bins, a first subset of points can be selected to represent the upper-region of the body, and a second subset of points can be selected to represent the lower-region of the body. The RCS of the upper-region is denoted as Ru, and RCS of the upper-region is denoted as $R_L$.

The reduce computational complexity, the electronic device 101 can avoid determining a change of elevation angle representing the whole body. Instead, changes to the lower-region RCS and upper-region RCS are tracked over a specified processing period of time, such as a statistic (average, maximum, or a number of standard deviations) of the duration of fall events previously recorded in a dataset such as ML-training data). The determines whether these changes of the RCSs satisfy a condition that defines a "stop" event. Additional details of detecting a stop event based on changes of the RCS is described further below with FIG. 20.

Figure 20:
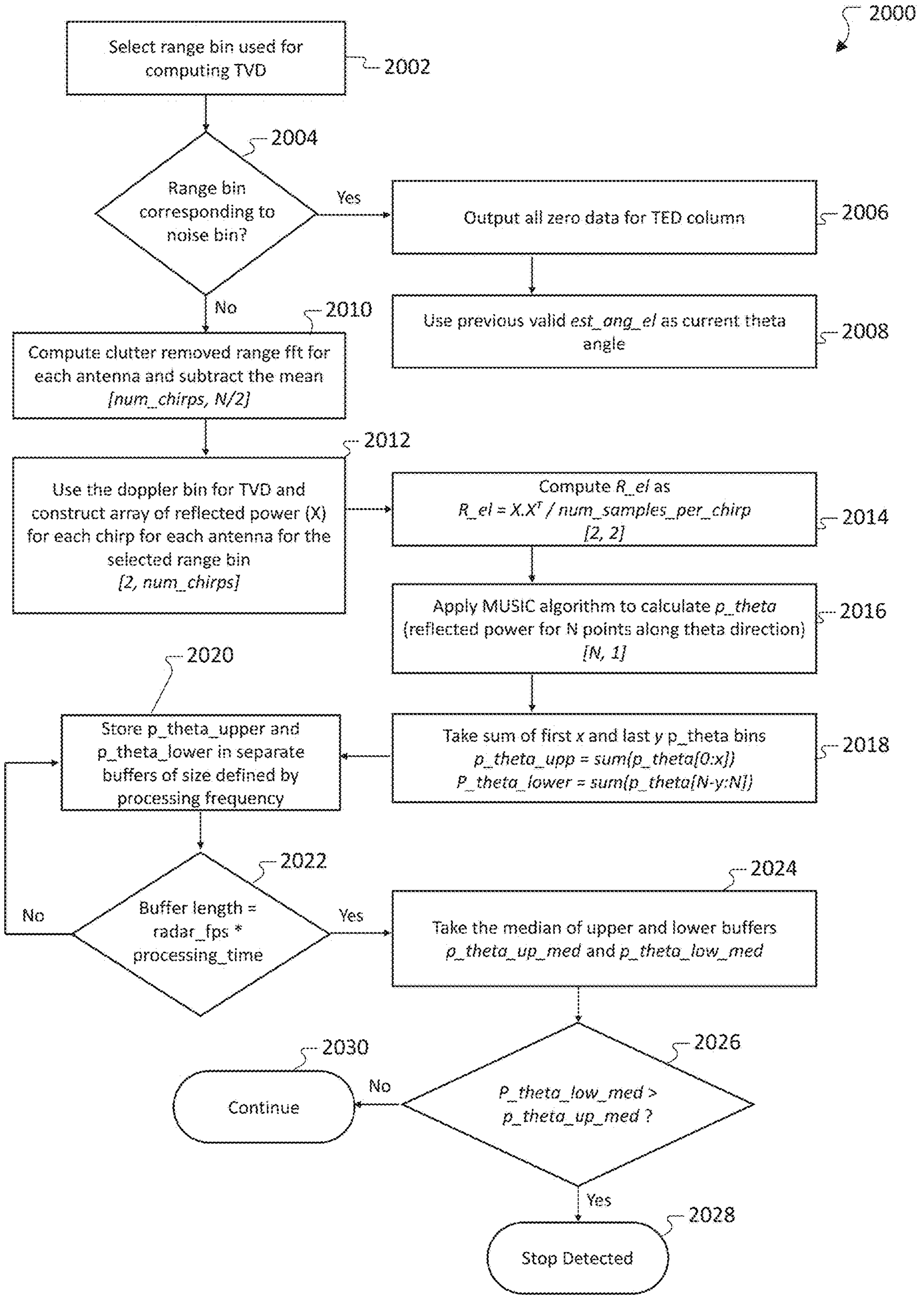
FIG. 20 illustrates an example method for detecting a pseudo-spectrum (p_theta) in accordance with an embodiment of this disclosure.
Figure 21:
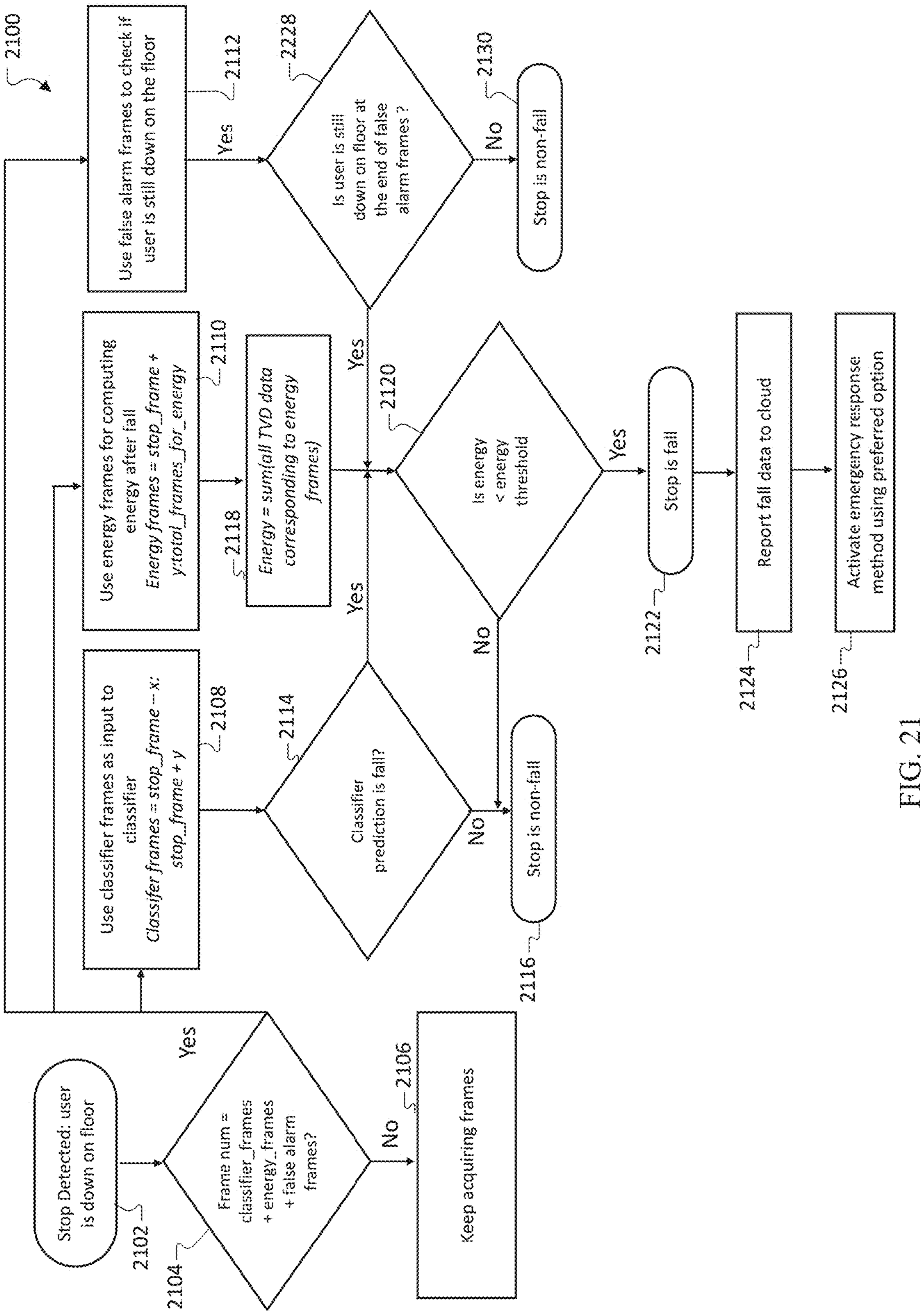
FIG. 21 illustrates an example method for classifying activity using an ML-based classifier working in conjunction with an energy-threshold based false-alarm preventer in accordance with an embodiment of this disclosure.
Figure 22:
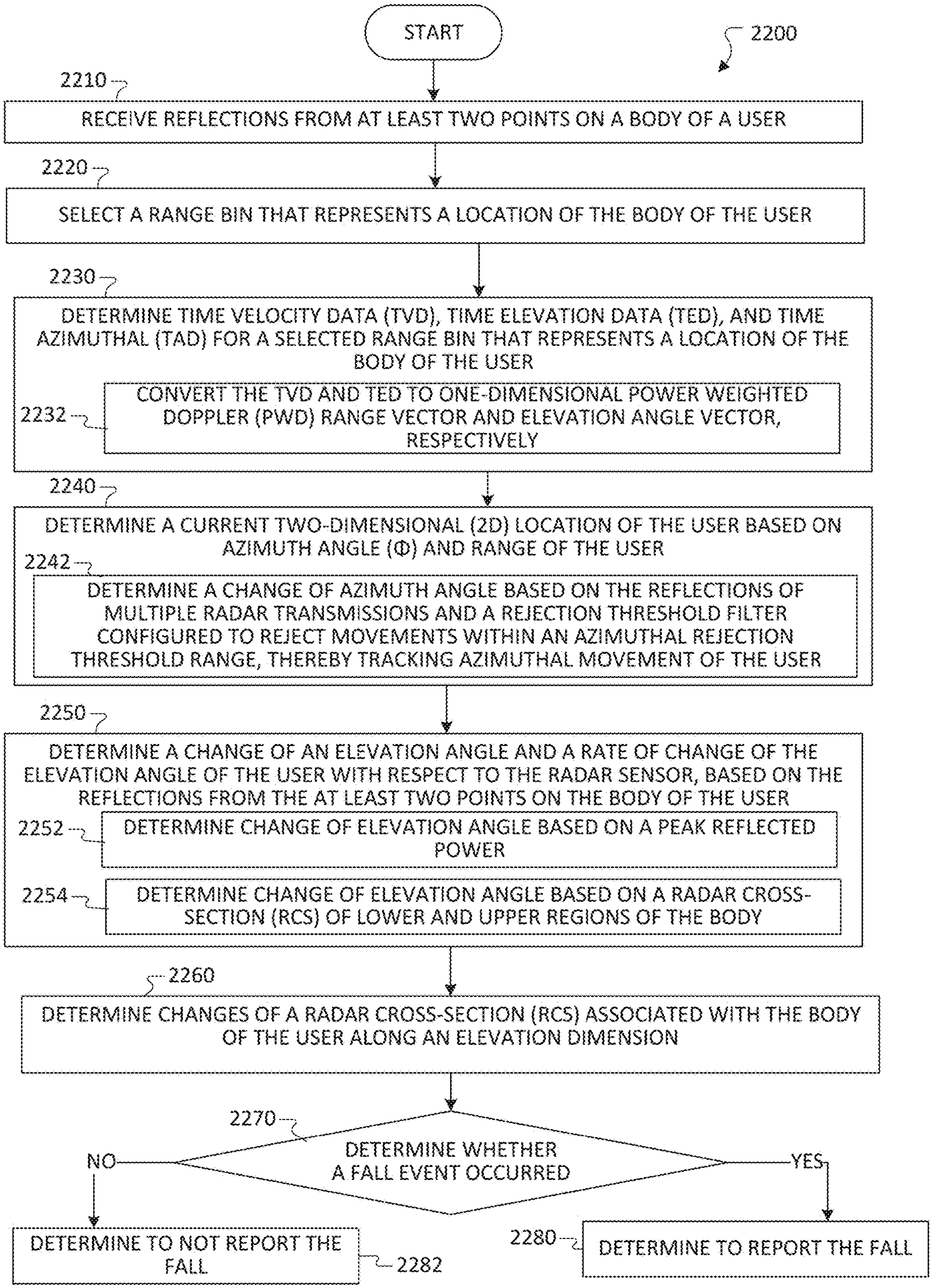
FIG. 22 illustrates an example method implemented by an end-to-end system for wireless ambient sensing using millimeter wave radar in accordance with an embodiment of this disclosure.

FIGS. 20-22 illustrate methods that can be executed in the electronic device 101 of FIG. 1, the SmartThings app 263 of FIG. 2, or the system 700 of FIG. 7, and for ease of explanation will be described as executed by the electronic device 101 of FIG. 1. FIG. 20 illustrates an example method 2000 for detecting a pseudo-spectrum (p_theta) in accordance with an embodiment of this disclosure. The embodiment of the method 2000 shown in FIG. 20 is for illustration only, and other embodiments could be used without departing from the scope of this disclosure.

The method 2000 can be implemented by the electronic device 101, when installed in the environment 1900, in which the user 1920 has fallen in a FoV of the radar 710. In the method 2000, the electronic device 101 compute the elevation angle that may be employed by directly using the pseudo-spectrum, which is used in the MUSIC algorithm. The pseudo-spectrum power can be considered to the angular distribution of the Radar Cross Section (RCS) of the target.

In an embodiment, the method 2000 is executed concurrently with the method 1400 of FIG. 14. In the embodiment shown, the method 2000 incorporates a partial (less than an entirety) of the method 1400. The procedures of blocks 2002-2016 in FIG. 20 are identical to as or similar to the procedures blocks 1402-1416 of FIG. 14, and descriptions are not duplicated in this disclosure.

At block 2018, the electronic device 101 determines a total power from the first x p_theta bins that correspond to the upper-region of the body such that p_theta_upp=sum (p_theta [0:x]). Further, the electronic device 101 determines a total power from the last y p_theta bins that correspond to the lower-region of the body, such that P_theta_lower=sum(p_theta [N−y:N]). This disclosure does not limit the first and second subsets of points to being the first x and last y from among the N points. Any suitable basis for selecting points from the upper-region and lower-region of the body can be used to define the first and second subsets of points, for example, x points having indices less than the median index can be the first subset of points, and y points having indices greater than the median index can be the second subset of points. The number x and the number y of points can be 6 upper-region points and 6 lower-region points.

At block 2020, the electronic device 101 can store p_theta_upper and p_theta_lower in separate buffers of a size defined by processing frequency. For example, the p_theta_upper can be a vector stored in an upper buffer, and the p_theta_lower can be another vector stored in a lower buffer.

At block 2022, the electronic device 101 can determine that the specified processing period has elapsed based on a determination that buffer length=radar_fps*processing_time. If the specified processing period has not yet elapsed, the method 2000 returns to block 2020.

At block 2024, the electronic device 101 can determine an average (such as the median) power of the values stored in each of the upper and lower buffers. For example, the electronic device 101 can determine p_theta_up_med as the median among the p_theta_upper values stored in the upper buffer. Analogously, the electronic device 101 can determine p_theta_low_med as the median among the p_theta_lower values stored in the lower buffer.

At block 2026, the electronic device 101 determines whether the p_theta_low_med exceeds the p_theta_up_med.

At block 2028, the electronic device 101 detects a "stop" event based on a determination that P_theta_low_med>p_theta_up_med is TRUE, which is a determination that an elevation-change threshold condition is satisfied. That is, the electronic device 101 can detect a "stop" event based on the change of the RCS during the specified processing period such that the average reflected power from the lower-region exceeds an average of the reflected power from the upper-region.

At block 2030, in response to a determination that that P_theta_low_med>p_theta_up_med is FALSE, which is a determination that the elevation-change threshold condition is not satisfied. That is, the electronic device 101 can determine that a "stop" event is not detected and can continue tracking the RCS of the upper and lower regions to track change of elevation of the user.

FIG. 21 illustrates an example method 2100 for classifying activity using an ML-based classifier working in conjunction with an energy-threshold based false-alarm preventer in accordance with an embodiment of this disclosure. The embodiment of the method 2100 shown in FIG. 21 is for illustration only, and other embodiments could be used without departing from the scope of this disclosure. The method 2100 will be described as executed by the electronic device 101 of FIG. 1 executing the ML-based classifier 880 and the energy-threshold based false-alarm preventer 890 from the pipeline 800 FIG. 8. It is understood that the electronic device 101 can instead use other classifiers and energy-threshold based false-alarm preventer, such as the classifier 1030 of FIG. 10.

The method begins at block 2102 at which a stop event is detected. The detected stop event indicates that the user is down on the floor. The electronic device 101, in response to determining that the condition for detecting the stop event is satisfied, generates an interrupt that indicates this particular frame 602 (referred to as the stop_frame) is the point in time at which the stop event occurred. The procedure performed at block 2102 can be the same as or similar to the procedure at block 1640 of FIG. 16 or block 2028 of FIG. 20.

At blocks 2104-2106, the electronic device 101 continues to acquire frames (such as frames 602 of FIG. 6) for a specified post-stop period of time. The indexing of each frame can begin with a frame number that is input to the classifier 880, namely for classifier_frames. After the classifier has detected a stop event, the indexing of each frame continues for energy_frames that are analyzed by the false-alarm preventer 890. If the false-alarm preventer 890 determines that the user is moving in an attempt to rise up from the floor (for example, attempting to stand again), the indexing of each frame continues for false alarm frames that are further analyzed by the false-alarm preventer 890 to determine if the user has risen up from the floor.

Particularly, at block 2104, the electronic device 101 determines whether the post-stop period of time has elapsed. The post-stop period of time can be measured in terms of a specified number of frames acquired after the detected stop event. Each of the acquired frames is indexed by a frame number and is counted to determine whether the specified number of frames has been acquired. At block 2106, the electronic device 101 continues to acquire frames in response to a determination that the post-stop period of time has not yet elapsed. Alternatively, in response to a determination that the post-stop period of time has elapsed, the method 2100 proceeds to blocks 2108, 2110, and 2112.

At block 2108, classifier frames are input to the classifier 880. The classifier frames can be defined as stop_frame–x: stop_frame+y. That is, the classifier_frames begin at a number (for example, x) of previous frames before the stop_frame, and continue through a number (for example, y) of subsequent frames after the stop_frame. That is, y can denote the count of the frames acquired after the stop_frame.

The method proceeds from block 2108 to block 2114 at which the classifier 880 determines whether the classifier prediction 882 indicates the stop event is classified as fall activity. In response to a determination that the classifier prediction 882 indicates the stop event is not classified as fall activity, the electronic device 101 determines, at block 2116, that the stop event is classified as non-fall activity. In some embodiments, the procedure at block 2116 can be the same as or similar to the procedure at block 1116 of FIG. 11. In some embodiments, the procedure at block 2116 can represent the procedure at block 1642 of FIG. 16 or block 2030 of FIG. 20.

At block 2110, energy frames are used for computing energy after the stop event. In other words, the electronic device 101 determines a total energy of the energy frames (illustrated as energy_frames). The total energy of the energy frames can be defined as stop_frame+y:total_frames_for_energy. The energy_frames begin at the stop_frame at which the stop event was detected, and continue through the current frame.

The method 2100 proceeds from block 2110 to block 2118 at which the electronic device 101 determines an energy value. For example, the electronic device 101 can calculate the energy value as a sum of all TVD data corresponding to the energy_frames.

At block 2120, the false-alarm preventer 890 determines if the total energy of the energy frames is less than an energy threshold. The energy threshold can be a value that indicates that the user is moving in an attempt to rise up from the floor after the user has fallen. In response to a determination that the total energy of the energy frames is greater than or equal to the energy threshold, the electronic device 101 determines, at block 2116, that the stop event is classified as non-fall activity. In response to a determination that the total energy of the energy frames is less than the energy threshold, the electronic device 101 determines, at block 2122, that the stop event is classified as valid fall activity.

In some embodiments, the procedure of block 2120 is performed only if the determination result at block 2114 indicates that the stop event is classified as fall activity. In such embodiments, if movements of the user's body cause radar reflections to have a total energy that is greater than or equal to the energy threshold, then the electronic device 101 can determine that the fall activity (as classified at block 2114) should not be reported to the cloud 708 because the user movement indicates enough energy for the user to rise up from the floor. If the user falls and is able to move afterwards enough to exhibit at least the threshold energy level, then it can be assumed that the fall did not cause serious injury to the user, thus a non-serious fall occurred. The preventer 890 can determine that the non-serious fall is non-fall activity that is associated with preventing a false fall-alarm. On the other hand, if movements of a fallen user indicate a total energy that is insufficient for the user to rise up from the floor, then it can be assumed that the fall caused serious injury to the user, thus a serious fall occurred. The false-alarm preventer 890 can determine that the serious fall is valid fall activity that is associated with triggering a fall-alarm to be reported at block 2124.

At block 2124, the electronic device 101 reports fall data to the cloud 708. For example, if the classification 892 indicates that the radar reflections are valid fall activity, then the electronic device 101 is triggered to report the fall event and to the relay of the information 722_b_-722_c_ corresponding to the fall event.

At block 2126, an emergency response method is activated using a preferred option. A user profile associated with the user 720 or device settings of the electronic device 101 can include settings indicating whether or not a reported fall event triggers activation of the emergency response method. For example, if the emergency response method is activated, the cloud 708 can transmit the relayed information 722_c_ to the smartphone 706, display a fall event notification 728, stream live video 725, and/or raise an emergency alert to emergency response services (such as the ambulance service).

At block 2112, false alarm frames are used to check if the user remains a fallen position, for example, the user is still down on the floor. At block 2228, the electronic device 101 can determine if the user is still down on the floor at the end of the false alarm frames, and if so, then method 2100 proceeds to block 2120, but if not, then the method proceeds to block 2130. At block 2130, the false-alarm preventer 890 determines that the stop event is associated with non-fall activity, based on a determination that the user has risen up from the floor (for example, the user is standing or walking after the stop event), thus a non-serious fall.

In some embodiments, the procedure of block 2120 is performed only if the determination result at block 2128 indicates that the user remains a fallen position, for example, for a specified period of time after the stop frame. For example, if the user has fallen, and is exhibiting energy that is at least the energy threshold level, then the false-alarm preventer 890 can determine that the user is still struggling or still unable to rise up from the floor due to a serious fall. The false-alarm preventer 890 can determine that the serious fall is valid fall activity at block 2122.

In some embodiments of block 2122, the electronic device 101 determines that the stop event represents valid fall activity only if all three determinations at blocks 2114, 2120, and 2228 indicate that the stop event represents fall activity.

Although FIG. 21 illustrates an example method 2100 for classifying activity using an ML-based classifier working in conjunction with an energy-threshold based false-alarm preventer, various changes may be made to FIG. 21. For example, while shown as a series of steps, various steps in FIG. 21 could overlap, occur in parallel, occur in a different order, or occur any number of times. As a particular example, in some embodiments of this disclosure, the electronic device 101 estimates a fall without considering an energy threshold, but instead estimates the fall using the activity classifier (such as the classifier 880 of FIG. 8 or 1030 of FIG. 10) and the false alarm frames. This way even if the radar sensor detects that there is movement of the user after the user has performed a fall, the detected stop event is not rejected as a non-fall due to energy (detected after the fall) being greater than the energy threshold. This makes fall detection more general but may increase the false alarm rate. Estimating a fall can mean determining whether a detected "stop" is a fall event or is a non-fall.

FIG. 22 illustrates a method 2200 implemented by an end-to-end system for wireless ambient sensing using millimeter wave radar in accordance with an embodiment of this disclosure. The embodiment of the method 2200 shown in FIG. 22 is for illustration only, and other embodiments could be used without departing from the scope of this disclosure. For ease of explanation, the method 2200 is described as being performed by the processor 120 of FIG. 1 operatively coupled to the radar sensor 180.

At block 2210, the radar sensor 180 receives reflections from at least two points on a body of a user. The radar sensor 180 can be the radar sensor 710 of FIG. 7. The radar transceiver 185 can transmit and receive radar signals. At block 2220, the processor 120 selects a range bin that represents a location of the body of the user.

At block 2230, the processor 120 determines time velocity data (TVD), time elevation data (TED), and time azimuthal (TAD) for a selected range bin that represents a location of the body of the user. At block 2232, the processor 120 converts the TVD and TED to one-dimensional power weighted Doppler (PWD) range vector and elevation angle vector, respectively;

At block 2240, the processor 120 determines a current two-dimensional (2D) location of the user based on azimuth angle (q) and range of the user. At block 2242, the processor 120 determines a change of azimuth angle based on the reflections of multiple radar transmissions and a rejection threshold filter configured to reject movements within an azimuthal rejection threshold range, thereby tracking azimuthal movement of the user.

At block 2250, the processor 120 determines a change of an elevation angle and a rate of change of the elevation angle of the user with respect to the radar sensor, based on the reflections from the at least two points on the body of the user. At block 2252, the change of an elevation angle and the rate of change of the elevation angle of the user are determined based on a peak reflected power. In some embodiments, from among the at least two points on the body of the user, the processor 120 selects M points along the elevation dimension based on a peak reflected power. The processor 120 determines an elevation angle for each of the M points with respect to the radar sensor 180; and can identify the elevation angle of the user as the elevation angle determined for a midpoint among the M points arranged in order of the magnitude of reflected power. At block 2254, the change of an elevation angle and the rate of change of the elevation angle of the user are determined based on a radar cross-section (RCS), such as the total power reflected from lower and upper regions of the body, namely the $R_L$ and the $R_U$.

At block 2260, the processor 120 determines changes of a radar cross-section (RCS) associated with the body of the user along an elevation dimension.

At block 2270, the processor 120 determines determine whether a fall event occurred based on at least one of: the rate of change and the change of the elevation angle, or the changes of the RCS. For example, the processor 120 can determine that the fall event occurred based on the change of the elevation angle satisfying a condition defined by an elevation rejection threshold. As an example, the elevation rejection threshold is applied at blocks 1624 and 1628 of FIG. 16. In some embodiments, the processor 120 determines whether to report the fall event based on a determination result of whether the user stood up after the fall event; and a determination result of whether the user remains fallen after elapse of a period associated with preventing false alarms.

At block 2280, the processor 120 determines to report the fall to the cloud 708. The procedure of block 2280 includes the procedure at block 2122 of FIG. 21. In some embodiments, at block 2282, the processor 120 determines to not report the fall to the cloud 708. The procedure of block 2282 include the procedure at block 2116 or block 2120 of FIG. 21.

In some embodiments, the processor 120 can determine the changes of the RCS associated with the body of the user based on sampling the body into multiple points that differentiate the body into at least two regions including a first region and a second region. Further, the processor 120 can compare a change of reflected power from the first region to a change of reflected power from the second region. The first and second regions respectively correspond to an upper-region and a lower-region of the body of the user. The processor 120 determines that the fall event occurred based on the change of the RCS during a specified processing period such that an average reflected power from the second region exceeds an average of the reflected power from the first region.

In some embodiments, from among the at least two points on the body of the user, the processor 120 selects M points along the elevation dimension based on a peak reflected power. The processor 120 determines an elevation angle for each of the M points with respect to the radar sensor. The processor 120 can identify the elevation angle of the user as the elevation angle determined for a midpoint among the M points arranged in order of the magnitude of reflected power. Further, the processor 120 determines that the fall event occurred based on the change of the elevation angle satisfying a condition defined by an elevation rejection threshold.

In some embodiments, the processor 120 determines a first range of angles that is from a minimum elevation angle to a maximum elevation angle of the body of the user with respect to the radar sensor; and interpolates a second range of angles based on the first range. To interpolate the second range of angles, the processor 120 can map the minimum elevation angle ($\theta_{min}$) to 0° and the maximum elevation angle ($\theta_{max}$) to 180°.

Although FIG. 22 illustrates an example method 2200 implemented by an end-to-end system for wireless ambient sensing using mmWave radar, various changes may be made to FIG. 22. For example, while shown as a series of steps, various steps in FIG. 22 could overlap, occur in parallel, occur in a different order, or occur any number of times.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:

receiving, by a radar sensor, reflections from at least two points on a body of a user;

determining, by a processor operatively coupled to the radar sensor, a change of an elevation angle and a rate of change of the elevation angle of the user with respect to the radar sensor, based on the reflections from the at least two points on the body of the user;

determining changes of a radar cross-section (RCS) associated with the body of the user along an elevation dimension; and determining whether a fall event occurred based on at least one of:

the rate of change and the change of the elevation angle, or the changes of the RCS.

2. The method of claim 1, further comprising:

determining the changes of the RCS associated with the body of the user based on sampling the body into multiple points that differentiate the body into at least two regions including a first region and a second region; and comparing a change of reflected power from the first region to a change of reflected power from the second region.

3. The method of claim 2, wherein:

the first and second regions respectively correspond to an upper-region and a lower-region of the user; and the method further comprises determining that the fall event occurred based on the change of the RCS during a specified processing period such that an average reflected power from the second region exceeds an average of the reflected power from the first region.

4. The method of claim 1, further comprising:

from among the at least two points on the body of the user, selecting M points along the elevation dimension based on a peak reflected power;

determining an elevation angle for each of the M points with respect to the radar sensor;

identifying the elevation angle of the user as the elevation angle determined for a midpoint among the M points arranged in order of magnitude of reflected power; and determining that the fall event occurred based on the change of the elevation angle satisfying a condition defined by an elevation rejection threshold.

5. The method of claim 1, further comprising:

determining a first range of angles that is from a minimum elevation angle to a maximum elevation angle of the body of the user with respect to the radar sensor; and interpolating a second range of angles based on the first range, wherein interpolating the second range of angles comprises mapping the minimum elevation angle to 0° and the maximum elevation angle to 180°.

6. The method of claim 1, further comprising:

determining time velocity data (TVD), time elevation data (TED), and time azimuthal (TAD) for a selected range bin that represents a location of the body of the user;

converting the TVD and TED to one-dimensional power weighted Doppler (PWD) range vector and elevation angle vector, respectively;

determining a current two-dimensional (2D) location of the user based on azimuth angle (φ) and range of the user; and determining a change of azimuth angle based on the reflections of multiple radar transmissions and a rejection threshold filter configured to reject movements within an azimuthal rejection threshold range, thereby tracking azimuthal movement of the user.

7. The method of claim 1, further comprising:

determining whether to report the fall event based on:

a determination result of whether the user stood up after the fall event; and a determination result of whether the user remains fallen after elapse of a period associated with preventing false alarms.

8. An electronic device comprising:

a radar sensor configured to receive reflections from at least two points on a body of a user; and a processor operatively coupled to the radar sensor and configured to:

determine a change of an elevation angle and a rate of change of the elevation angle of the user with respect to the radar sensor, based on the reflections from the at least two points on the body of the user;

determine changes of a radar cross-section (RCS) associated with the body of the user along an elevation dimension; and determine whether a fall event occurred based on at least one of:

the rate of change and the change of the elevation angle, or the changes of the RCS.

9. The electronic device of claim 8, wherein the processor is further configured to:

determine the changes of the RCS associated with the body of the user based on sampling the body into multiple points that differentiate the body into at least two regions including a first region and a second region; and compare a change of reflected power from the first region to a change of reflected power from the second region.

10. The electronic device of claim 9, wherein:

the first and second regions respectively correspond to an upper-region and a lower-region of the user; and the processor is further configured to determine that the fall event occurred based on the change of the RCS during a specified processing period such that an average reflected power from the second region exceeds an average of the reflected power from the first region.

11. The electronic device of claim 8, wherein the processor is further configured to:

from among the at least two points on the body of the user, select M points along the elevation dimension based on a peak reflected power;

determine an elevation angle for each of the M points with respect to the radar sensor;

identify the elevation angle of the user as the elevation angle determined for a midpoint among the M points arranged in order of magnitude of reflected power; and determine that the fall event occurred based on the change of the elevation angle satisfying a condition defined by an elevation rejection threshold.

12. The electronic device of claim 8, wherein the processor is further configured to:

determine a first range of angles that is from a minimum elevation angle to a maximum elevation angle of the body of the user with respect to the radar sensor; and interpolate a second range of angles based on the first range, wherein to interpolate the second range of angles, the processor is further configured to map the minimum elevation angle to 0° and the maximum elevation angle to 180°.

13. The electronic device of claim 8, wherein the processor is further configured to:

determine time velocity data (TVD), time elevation data (TED), and time azimuthal (TAD) for a selected range bin that represents a location of the body of the user;

convert the TVD and TED to one-dimensional power weighted Doppler (PWD) range vector and elevation angle vector, respectively;

determine a current two-dimensional (2D) location of the user based on azimuth angle (?) and range of the user; and determine a change of azimuth angle based on the reflections of multiple radar transmissions and a rejection threshold filter configured to reject movements within an azimuthal rejection threshold range, thereby tracking azimuthal movement of the user.

14. The electronic device of claim 8, wherein the processor is further configured to:

determine whether to report the fall event based on:

a determination result of whether the user stood up after the fall event; and a determination result of whether the user remains fallen after elapse of a period associated with preventing false alarms.

15. A non-transitory computer readable medium embodying a computer program, the computer program comprising program code that, when executed by a processor of an electronic device, causes the electronic device to:

receive, by a radar sensor, reflections from at least two points on a body of a user; and determine a change of an elevation angle and a rate of change of the elevation angle of the user with respect to the radar sensor, based on the reflections from the at least two points on the body of the user;

determine changes of a radar cross-section (RCS) associated with the body of the user along an elevation dimension; and determine whether a fall event occurred based on at least one of:

the rate of change and the change of the elevation angle, or the changes of the RCS.

16. The non-transitory computer readable medium of claim 15, wherein the program code, when executed by the processor, causes the electronic device to:

determine the changes of the RCS associated with the body of the user based on sampling the body into multiple points that differentiate the body into at least two regions including a first region and a second region; and compare a change of reflected power from the first region to a change of reflected power from the second region.

17. The non-transitory computer readable medium of claim 16, wherein:

the first and second regions respectively correspond to an upper-region and a lower-region of the user; and the program code, when executed by the processor, causes the electronic device to determine that the fall event occurred based on the change of the RCS during a specified processing period such that an average reflected power from the second region exceeds an average of the reflected power from the first region.

18. The non-transitory computer readable medium of claim 15, wherein the program code, when executed by the processor, causes the electronic device to:

from among the at least two points on the body of the user, select M points along the elevation dimension based on a peak reflected power;

determine an elevation angle for each of the M points with respect to the radar sensor;

identify the elevation angle of the user as the elevation angle determined for a midpoint among the M points arranged in order of magnitude of reflected power; and determine that the fall event occurred based on the change of the elevation angle satisfying a condition defined by an elevation rejection threshold.

19. The non-transitory computer readable medium of claim 15, wherein the program code, when executed by the processor, causes the electronic device to:

determine a first range of angles that is from a minimum elevation angle to a maximum elevation angle of the body of the user with respect to the radar sensor; and interpolate a second range of angles based on the first range, wherein to interpolate the second range of angles, the processor is further configured to map the minimum elevation angle to 0° and the maximum elevation angle to 180°.

20. The non-transitory computer readable medium of claim 15, wherein the program code, when executed by the processor, causes the electronic device to:

determine time velocity data (TVD), time elevation data (TED), and time azimuthal (TAD) for a selected range bin that represents a location of the body of the user;

convert the TVD and TED to one-dimensional power weighted Doppler (PWD) range vector and elevation angle vector, respectively;

determine a current two-dimensional (2D) location of the user based on azimuth angle (φ) and range of the user; and determine a change of azimuth angle based on the reflections of multiple radar transmissions and a rejection threshold filter configured to reject movements within an azimuthal rejection threshold range, thereby tracking azimuthal movement of the user.

* * * * *